(12) United States Patent
Weihs et al.

(10) Patent No.: US 12,006,454 B2
(45) Date of Patent: Jun. 11, 2024

(54) PAPER ARTICLE COMPRISING A PAPER COMPONENT AND A HEAT-SEALABLE COATING

(71) Applicant: OMYA INTERNATIONAL AG, Oftringen (CH)

(72) Inventors: Jan Philipp Weihs, Dudingen (CH); Fabien Wilhelm Monnard, Aarburg (CH)

(73) Assignee: OMYA INTERNATIONAL AG, Oftringen (CH)

( * ) Notice: Subject to any disclaimer, the term of this patent is extended or adjusted under 35 U.S.C. 154(b) by 0 days.

(21) Appl. No.: 17/755,788

(22) PCT Filed: Nov. 25, 2020

(86) PCT No.: PCT/EP2020/083396
§ 371 (c)(1),
(2) Date: May 7, 2022

(87) PCT Pub. No.: WO2021/105231
PCT Pub. Date: Jun. 3, 2021

(65) Prior Publication Data
US 2022/0380633 A1  Dec. 1, 2022

(30) Foreign Application Priority Data
Nov. 26, 2019 (EP) .................................. 19211657

(51) Int. Cl.
| | | |
|---|---|---|
| *C09J 7/35* | (2018.01) | |
| *B32B 21/06* | (2006.01) | |
| *B32B 27/10* | (2006.01) | |
| *B32B 27/30* | (2006.01) | |
| *B32B 27/32* | (2006.01) | |
| *B32B 27/36* | (2006.01) | |
| *B32B 29/00* | (2006.01) | |
| *C09J 5/06* | (2006.01) | |
| *C09J 7/21* | (2018.01) | |
| *C09J 11/04* | (2006.01) | |
| *D21H 27/36* | (2006.01) | |

(52) U.S. Cl.
CPC ............... *C09J 7/35* (2018.01); *B32B 21/06* (2013.01); *B32B 27/10* (2013.01); *B32B 27/302* (2013.01); *B32B 27/32* (2013.01); *B32B 27/36* (2013.01); *B32B 29/005* (2013.01); *C09J 5/06* (2013.01); *C09J 7/21* (2018.01); *C09J 11/04* (2013.01); *D21H 27/36* (2013.01); *B32B 2250/26* (2013.01); *B32B 2255/12* (2013.01); *B32B 2255/20* (2013.01); *B32B 2255/26* (2013.01); *B32B 2255/28* (2013.01); *B32B 2270/00* (2013.01); *C09J 2301/304* (2020.08); *C09J 2301/414* (2020.08); *C09J 2400/283* (2013.01); *C09J 2400/286* (2013.01); *C09J 2400/306* (2013.01); *C09J 2423/04* (2013.01); *C09J 2433/00* (2013.01)

(58) Field of Classification Search
None
See application file for complete search history.

(56) References Cited

U.S. PATENT DOCUMENTS

| | | | | |
|---|---|---|---|---|
| 5,336,528 | A * | 8/1994 | Bohme | ................. D21H 19/18 427/349 |
| 5,763,100 | A | 6/1998 | Quick et al. | |
| 7,749,583 | B2 * | 7/2010 | Fugitt | .................... D21H 17/63 162/158 |

FOREIGN PATENT DOCUMENTS

| | | |
|---|---|---|
| CN | 107075197 A | 8/2017 |
| EP | 3219750 A1 | 9/2017 |
| JP | S5658096 A | 5/1981 |

OTHER PUBLICATIONS

CN107075197A (Aug. 18, 2017)—English-language abstract from EspaceNet, 1 page.
International Search Report and Written Opinion from PCT/EP2020/083396, mailed Jan. 20, 2021, 12 pages.

(Continued)

*Primary Examiner* — Sheeba Ahmed
(74) *Attorney, Agent, or Firm* — ALGM LLP; Harry J. Guttman

(57) ABSTRACT

The present invention refers to a paper article comprising a paper component having a first side and a second side, wherein the first side and/or the second side of the paper component is at least partially coated with a heat-sealable coating, wherein the heat-sealable coating comprises a first polymer comprising units derived from a (meth)acrylate and/or (meth)acrylic acid and/or a salt thereof, and a second polymer, being different from the first polymer, comprising units derived from a) a (meth)acrylate and/or (meth)acrylic acid and/or a salt thereof, and b) an alkene, wherein the first polymer and the second polymer are present in the heat-sealable coating in a weight ratio of 90:10 to 35:65, and wherein the first polymer and the second polymer are present in the heat-sealable coating in an overall amount of at least 50 wt. %, based on the total weight of the coating. Furthermore, the present invention refers to a laminate comprising a paper component, a substrate and a heat-seal layer being present between the paper component and the substrate, which is obtained by heat-sealing a paper article according to the present invention to the substrate. The invention also refers to a use of a coating for heat-sealing a paper component to a substrate.

22 Claims, 7 Drawing Sheets

(56) References Cited

OTHER PUBLICATIONS

Figure 1:
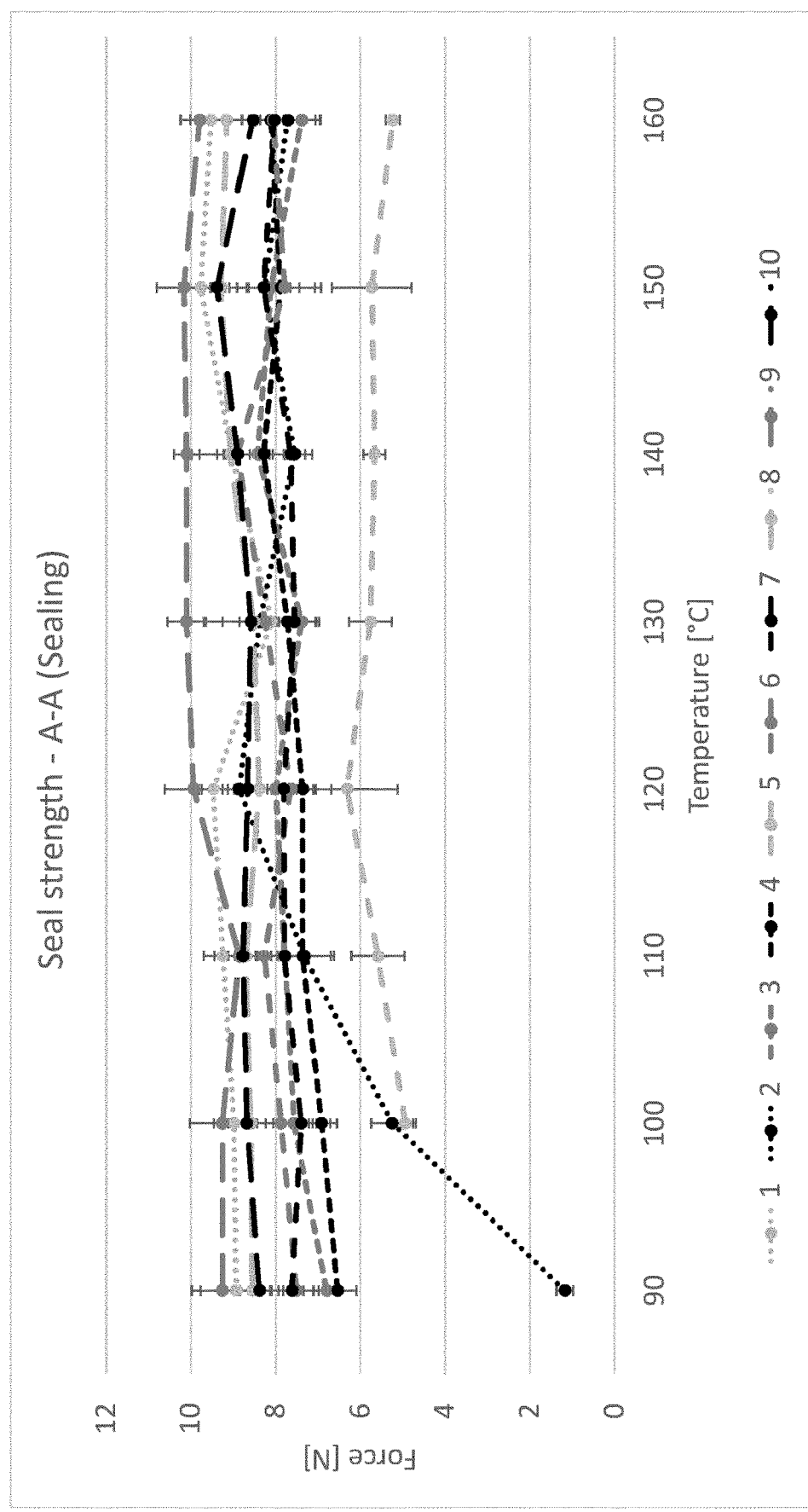

JP patent Appl. No. S5658096A (May 20, 1981)—English language description from Patent Translate (Powered by EPO and Google), 6 pages.
Wei Jun, 2011, Technology of Polymer Synthesis, pp. 163-165, East China University of Technology Press. (7 pages).
Wei Jun, 2011, Technology of Polymer Synthesis, pp. 163-165, East China University of Technology Press. English language machine translation (4 pages).
Jurkka Kuusipalo, 2017, Paper and Paperboard Processing vol. 13, Chinese Version, pp. 65-66, China Light Industry Press. (6 pages).
Jurkka Kuusipalo, 2017, Paper and Paperboard Processing vol. 13, Chinese Version, pp. 65-66, China Light Industry Press. English language machine translation (3 pages).

\* cited by examiner

PAPER ARTICLE COMPRISING A PAPER COMPONENT AND A HEAT-SEALABLE COATING

The present invention refers to a paper article comprising a paper component and a heat-sealable coating. Furthermore, the present invention refers to a laminate obtained by heat-sealing the inventive paper article to a substrate and to the use of a coating for heat-sealing a paper component to a substrate.

Laminates containing fiber-based articles such as paper, paperboard etc. are known in the art for packaging, drug store articles, hygiene articles, construction, decoration and the like. For example, the packaging industry produces container for food, beverage or drugstore articles such as cups, bowls, bottles, blister packs etc. from laminates made of paper articles and plastic materials.

The preparation of a paper-based laminate requires a bonding agent for connecting the paper material either to another substrate of the same kind or to a substrate of a different kind. Paper articles are often coated with a heat-sealable agent as bonding agent. Heat-sealable agents are usually applied by extrusion or in form of a coating composition on the surface of a substrate. After cooling and/or drying, the heat-sealable coating can be reactivated by heat, and optionally pressure, to bond the paper to another substrate forming a laminate.

However, known laminates obtained by heat-sealing paper materials suffer from various drawbacks. For example, paper-based laminates are often bonded together by heat-sealable agents, which are selective for certain substrates, i.e. the heat-sealable agent can only be used for bonding the paper material to one, or a few, specific substrates. Thereby, the preparation of the laminate is limited to specific combinations of paper material, heat-sealable agent and substrate. As a result, a producer of e.g. a packaging or a hygiene article can be limited in its choice for base materials used for the product. Alternatively, the producer has to produce or purchase different paper materials, different heat-sealable agents or different substrates to be able to adapt the combination of base materials according to his needs. It may also be necessary to adapt the production line for applying a specific heat-sealable coating onto the paper base material. Thus, it is desirable to provide paper with a heat-sealable agent, which provides a maximum of versatility for bonding paper to substrates.

Another problem in the art is that lamination of a paper using a heat-sealable coating can require high temperatures during the heat-sealing process to obtain satisfactory bonding to the substrate. In view thereof, it is desirable to provide a heat-sealable agent, which seals a paper to a substrate at low temperatures.

In addition to the foregoing, in many applications, a paper material being heat-sealed by forming a laminate needs to have a specific other properties such as a specific water resistance, a specific oil resistance or has to have a specific water (vapor) barrier property etc. In such cases, the heat-sealable coating of the paper is often not sufficient to satisfy for all requirements, and therefore further paper coatings may become necessary.

Furthermore, it is sometimes necessary to further modify or fine tune the seal strength of a heat-sealed laminate for its application on paper, in order to avoid undesired breakage or delamination between the paper material and the support. This is however difficult to achieve with known heat-sealable coatings.

In view of the above, there is a continuous need for alternative or improved paper products being at least partially coated by a heat-sealable coating. There is further a need in the art for alternative or improved laminates comprising a substrate being bonded to a paper article by a heat-seal layer. There is also a need in the art for alternative or improved heat-sealable coatings for use in heat-sealing a paper product to a substrate. Finally, there is a need in the art for alternative or improved process application in order to reduce logistic and improve competitiveness as well as reducing environmental impact of the final product.

The present invention is defined by the paper article, the laminate and the use as specified in the independent claims.

In one aspect of the present invention, a paper article is provided. The paper article comprises a paper component having a first side and a second side, wherein the first side and/or the second side of the paper component is at least partially coated with a heat-sealable coating, wherein the heat-sealable coating comprises a first polymer comprising units derived from a (meth)acrylate, and/or (meth)acrylic acid and/or a salt thereof, and a second polymer, being different from the first polymer, comprising units derived from
a) a (meth)acrylate, and/or (meth)acrylic acid and/or a salt thereof, and
b) an alkene, wherein the first polymer and the second polymer are present in the heat-sealable coating in a weight ratio of 90:10 to 35:65, and wherein the first polymer and the second polymer are present in the heat-sealable coating in an overall amount of at least 50 wt. %, based on the total weight of the coating.

In another aspect of the present invention, a laminate is provided. The laminate comprises a substrate, a paper component, and a heat-seal layer being present between the paper component and the substrate, wherein the laminate is obtained by heat-sealing a paper article according to the invention to the substrate.

In yet another aspect of the present invention, a use of a coating for heat-sealing a paper component to a substrate is provided, the coating comprising a first polymer comprising units derived from a (meth)acrylate, and/or (meth)acrylic acid and/or a salt thereof, and a second polymer, being different from the first polymer, comprising units derived from
a) a (meth)acrylate, and/or (meth)acrylic acid and/or a salt thereof, and
b) an alkene, wherein the first polymer and the second polymer are present in the coating in a weight ratio of 90:10 to 35:65, and wherein the first polymer and the second polymer are present in the coating in an overall amount of at least 50 wt. %, based on the total weight of the coating.

Advantageous embodiments of the present invention are defined in the dependent claims.

According to one embodiment of the present invention, the first polymer and the second polymer are present in the heat-sealable coating in a weight ratio of 90:10 to 45:55, preferably in a weight ratio of 90:10 to 55:45, more preferably 85:15 to 65:35, and most preferably 85:15 to 75:25.

According to one embodiment of the present invention, the heat-sealable coating further comprises a wax in an amount of from 0.1 to 20 wt. %, preferably 1 to 20 wt. %, more preferably 5 to 15 wt. %, and most preferably 5 to 10 wt. %, based on the total weight of the coating.

According to one embodiment of the present invention, the first polymer is selected from the group consisting of (meth)acrylate/acrylic acid polymers and salts thereof, poly (meth)acrylic acids and salt thereof, and mixtures thereof, preferably is a (meth)acrylate/acrylic acid polymer or a salt thereof, and more preferably is an acrylate/acrylic acid polymer or a salt thereof.

According to one embodiment of the present invention, the second polymer is selected from the group consisting of ethylene/(meth)acrylate polymers, ethylene/(meth)acrylate/(meth)acrylic acid polymers and salts thereof, ethylene/(meth)acrylic acid polymers and salts thereof, and mixtures thereof, preferably is an ethylene/(meth)acrylic acid polymer or a salt thereof, and more preferably is an ethylene/acrylic acid polymer or a salt thereof.

According to one embodiment of the present invention, the first polymer and the second polymer are present in the heat-sealable coating in an overall amount of at least 60 wt. %, preferably at least 70 wt. %, more preferably at least 80 wt. %, and most preferably at least 85 wt. %, based on the total weight of the coating.

According to one embodiment of the present invention, the heat-sealable coating further comprises a mineral material, preferably a calcium carbonate, in an amount of from 0.1 to 49 wt. %, preferably 1 to 35 wt. %, more preferably 10 to 30 wt. %, and most preferably 15 to 25 wt. %, based on the total weight of the coating.

According to one embodiment of the present invention, the heat-sealable coating is present on the first side and/or the second side of the paper component in an amount of from 1 to 50 g/m$^2$, preferably from 2 to 20 g/m$^2$, and more preferably from 4 to 10 g/m$^2$, and/or the first side and/or the second side, preferably only the first side, of the paper component is fully coated with the heat-sealable coating.

According to one embodiment of the present invention, the paper component is a paper, a cardboard or a paperboard, preferably having a grammage in the range of from 15 to 400 g/m$^2$, more preferably from 50 to 350 g/m$^2$, and most preferably 100 to 300 g/m$^2$.

According to one embodiment of the present invention, the paper component is pre-coated on the first side and/or the second side with a pre-coating comprising a mineral, preferably a calcium carbonate.

According to one embodiment of the present invention, the substrate is
  a cellulose-based substrate, preferably a paper substrate or a wood substrate, more preferably a paper or a paperboard, a polar polymer, preferably a polyester, and most preferably polylactic acid, a polyhydroxyalkanoate or a furandicarboxylic acid-based polyester, or a nonpolar polymer, preferably selected from the group consisting of polyethylene, polypropylene and polystyrene.

According to one embodiment of the present invention, the heat-sealing is carried out at a temperature in the range of from 50 to 180° C., preferably from 90 to 160° C., more preferably from 110 to 140° C., and/or
  the heat-sealing is carried out by applying a force per area in the range of from 0.05 to 50 N/mm$^2$, preferably from 0.1 to 20 N/mm$^2$, and more preferably from 0.2 to 5 N/mm$^2$, and/or the heat-sealing is carried out one or more times over a time period in the range of from 0.1 to 100 seconds, preferably from 0.1 to 5 seconds, more preferably from 0.2 to 1 seconds.

According to one embodiment of the present invention, the substrate is a polar polymer, preferably a polyester, and more preferably a polylactic acid, a polyhydroxyalkanoate or furandicarboxylic acid-based polyester, or the substrate is a nonpolar polymer, preferably selected from the group consisting of polyethylene, polypropylene and polystyrene.

It should be understood that for the purposes of the present invention, the following terms have the following meanings:

A "paper component" in the meaning of the present invention is a product obtained by pressing a cellulose suspension, optionally comprising additives, and drying the pressed cellulose web, to obtain a sheet.

A polymer "comprising units derived from" a specific monomer means that the polymer is obtained by polymerizing at least the specific monomer (e.g. (meth)acrylate, (meth)acrylic acid).

A "unit" means repeating unit of the polymer. A skilled person understands which monomer leads to which polymer repeating unit.

A "(meth)acrylic acid" in the meaning of the present invention is acrylic acid or methacrylic acid.

A "salt of a (meth)acrylic acid" in the meaning of the present invention is acrylic acid or a methacrylic acid, wherein the carboxylic acid group is neutralized by mono-, di-, and/or trivalent cations, such as alkali cations and/or earth alkali cations.

A "(meth)acrylate", i.e. acrylate or a methacrylate, in the meaning of the present invention is an ester of (meth)acrylic acid, i.e. an ester of acrylic acid or an ester of methacrylic acid. For example, the "(meth)acrylate" may be an alkyl acrylate or an alkyl methacrylate. An "alkyl acrylate" is, for example, a $C_1$-$C_6$-alkyl acrylate such as methyl acrylate or butyl acrylate. An "alkyl methacrylate" is, for example a $C_1$-$C_6$-alkyl methacrylate such as methyl methacrylate or butyl methacrylate.

A "(meth)acrylate/(meth)acrylic acid polymer" in the meaning of the present invention is a polymer consisting of units derived from at least one (meth)acrylate and at least one (meth)acrylic acid. A "salt of a (meth)acrylate/(meth)acrylic acid polymer" is a polymer consisting of units derived from at least one (meth)acrylate and at least one (meth)acrylic acid, wherein the carboxylic acid groups of the units derived from at least one (meth)acrylic acid are at least partially neutralized by mono-, di-, and/or trivalent cations, such as alkali cations (e.g. sodium cations) and/or earth alkali cations.

A "poly(meth)acrylic acid" in the meaning of the present invention is a polymer consisting of units derived from at least one (meth)acrylic acid. A "salt of a poly(meth)acrylic acid" is a poly(meth)acrylic acid polymer, wherein the carboxylic acid groups of the units derived from at least one (meth)acrylic acid are at least partially neutralized by mono-, di-, and/or trivalent cations, such as alkali cations and/or earth alkali cations.

An "ethylene/(meth)acrylate/(meth)acrylic acid polymer" in the meaning of the present invention is a polymer consisting of units derived from ethylene, at least one (meth)acrylate and at least one (meth)acrylic acid. A "salt of an ethylene/(meth)acrylate/(meth)acrylic acid polymer" is a polymer consisting of units derived from ethylene, at least one (meth)acrylate and at least one (meth)acrylic acid, wherein the carboxylic acid groups of the units derived from at least one (meth)acrylic acid are at least partially neutralized by mono-, di-, and/or trivalent cations, such as alkali cations and/or earth alkali cations.

An "ethylene/(meth)acrylic acid polymer" in the meaning of the present invention is a polymer consisting of units derived from ethylene and at least one (meth)acrylic acid.

An example is ethylene acrylic acid copolymer. A "salt of an ethylene/(meth)acrylic acid polymer" is a polymer consisting of units derived from ethylene and at least one (meth) acrylic acid, wherein the carboxylic acid groups of the units derived from at least one (meth)acrylic acid are at least partially neutralized by mono-, di-, and/or trivalent cations, such as alkali cations and/or earth alkali cations.

A "heat-sealing" in the meaning of the present invention is to be understood as a process, wherein a seal layer is formed from a heat-sealable coating between a paper component and a substrate by subjecting the heat-sealable coating to an elevated temperature, preferably above 50° C., more preferably above 70° C. It is to be understood that such a process is not limited to specific means of providing the elevated temperature. Thus, the elevated temperature can be provided by applying thermal heat or by ultrasonification. For example, heat-sealing can be carried out by hot jaw sealing, ultrasonic sealing, induction sealing, hot air sealing or ironing.

A "polar polymer" in the meaning of the present invention is a polymer comprising units derived from at least one monomer including a polar functional group. A "polar functional group" is for example an ester, a carboxylic acid, a carboxylate, a nitrile, a halogen, an amide, a sulfone, an imine or an ether.

A "nonpolar polymer" in the meaning of the present invention is a polymer consisting of units derived from at least one hydrocarbon monomer. A hydrocarbon monomer is for example ethylene, propylene, butadiene, butene, styrene, isobutene or isoprene.

The "particle size" of particulate materials herein is described by its distribution of particle sizes $d_x$. Therein, the value $d_x$ represents the diameter relative to which x % by weight of the particles have diameters less than $d_x$. This means that, for example, the $d_{50}$ value is the particle size at which 20 wt.-% of all particles are smaller than that particle size. The $d_{50}$ value is thus the weight median particle size, i.e. 50 wt.-% of all particles are smaller than this particle size. For the purpose of the present invention, the particle size is specified as weight median particle size $d_{50}$ (wt.) unless indicated otherwise. Particle sizes were determined by using a Sedigraph™ 5125 instrument of Micromeritics Instrument Corporation. The method and the instrument are known to the skilled person and are commonly used to determine the particle size of fillers and pigments. The measurements were carried out in an aqueous solution of 0.1 wt.-% $Na_4P_2O_7$.

Where an indefinite or definite article is used when referring to a singular noun, e.g., "a", "an" or "the", this includes a plural of that noun unless anything else is specifically stated. Where the term "comprising" is used in the present description and claims, it does not exclude other elements.

For the purposes of the present invention, the term "consisting of" is considered to be a preferred embodiment of the term "comprising". If hereinafter a group is defined to comprise at least a certain number of embodiments, this is also to be understood to disclose a group, which preferably consists only of these embodiments.

Terms like "obtainable" or "definable" and "obtained" or "defined" are used interchangeably. This, for example, means that, unless the context clearly dictates otherwise, the term "obtained" does not mean to indicate that, for example, an embodiment must be obtained by, for example, the sequence of steps following the term "obtained" though such a limited understanding is always included by the terms "obtained" or "defined" as a preferred embodiment.

Whenever the terms "including" or "having" are used, these terms are meant to be equivalent to "comprising" as defined hereinabove.

The Paper Article

One aspect of the present invention refers to a paper article comprising a paper component having a first side and a second side, wherein the first side and/or the second side of the paper component is at least partially coated with a heat-sealable coating, the heat-sealable coating comprises a first polymer comprising units derived from a (meth)acrylate, and/or (meth)acrylic acid and/or a salt thereof, and a second polymer, being different from the first polymer, comprising units derived from a) a (meth)acrylate, and/or (meth)acrylic acid and/or a salt thereof, and b) an alkene, wherein the first polymer and the second polymer are present in the heat-sealable coating in a weight ratio of 90:10 to 35:65, and wherein the first polymer and the second polymer are present in the heat-sealable coating in an overall amount of at least 50 wt. %, based on the total weight of the coating.

The inventors found that the inventive paper article can be heat-sealed to a variety of different substrates including polar substrates such as polylactic acid and nonpolar substrates such as polyethylene. In particular, it has been found that by using a heat-sealable coating comprising the first polymer and the second polymer in a weight ratio of >35:<65, the paper article can be heat-sealed against a polar substrate or a nonpolar substrate. In contrast thereto, the use of a heat-sealable coating comprising the first polymer and the second polymer in a weight ratio of <35:>65 leads to a loss of heat-sealability against polar substrates. Furthermore, it has been found that by using a heat-sealable coating comprising the first polymer and the second polymer in a weight ratio of <90:>10, the seal initiation temperatures of the composition can be lowered. In contrast thereto, the use of a heat-sealable coating comprising the first polymer and the second polymer in a weight ratio of <90:>10 leads to an increase of the seal initiation temperature and/or has a negative effect on other aspects, e.g. can lead to an increased blocking of the paper article.

Thus, by using the inventive paper article, producer of paper-based laminates are more flexible regarding the use of substrates to be laminated and/or can avoid adapting their production facilities, or the heat-sealable coating of the paper, for producing a specific desired laminate. Furthermore, the inventive paper article can be heat-sealed to different substrates at specifically low temperatures. Thus, the use of the inventive paper article for preparing a laminate can be carried out using less energy and/or using a vast range of different sealing techniques without being limited to a specific high-temperature heat-sealing technique.

The inventive paper article can have a specific residual water moisture content. According to one embodiment, the paper article has a residual moisture content of below 20 wt. %, preferably below 10 wt. %, and most preferably of below 8 wt. % (e.g. 4 to 8 wt. %), based on the total weight of the paper article, and at a relative humidity in the range of 35 to 55%, preferably 40 to 50%.

The residual water moisture content can be determined by a standard process for measuring the residual moisture content of coated paper products. For example, the residual moisture content can be determined by drying a sample of the paper article in an oven at 120° C. for 5 min and measuring the total weight of the paper article before and after drying.

$$\text{wt.-\% moisture}_{PA} = \frac{\text{weight}_{PA}[g] \text{ before drying} - \text{weight}_{PA}[g] \text{ after drying}}{\text{weight}_{PA}[g] \text{ before drying}} \times 100$$

with PA=paper article.

According to one embodiment, the heat-sealable coating has a residual water moisture of ≤0 wt. %, based on the total weight of the heat-sealable coating.

The paper article comprises a paper component having a first side and a second side, wherein the first side and/or the second side of the paper component is at least partially coated with a heat-sealable coating.

According to one embodiment, the paper article consists of a paper component having a first side and a second side, wherein the first side and/or the second side of the paper component is at least partially coated with a heat-sealable coating.

The paper component of the inventive paper article is not limited to a specific paper component. Suitable paper components are, for example, fine paper, paper, recycled paper, paperboard, corrugated paperboard, card stock, wall paper, photo paper or tissue paper. Furthermore, the paper component is not limited to a specific shape or form. The paper component may be die cutted and/or cut to a specific geometrical form etc.

In a preferred embodiment, the paper component is a paper, a card stock or a paperboard.

In another preferred embodiment, the paper component has a grammage in the range of from 15 to 400 g/m², more preferably from 50 to 350 g/m², and most preferably 100 to 300 g/m².

In another preferred embodiment, the paper component is a paper, a card stock or a paperboard having a grammage in the range of from 15 to 400 g/m², more preferably from 50 to 350 g/m², and most preferably 100 to 300 g/m².

For example, the paper component can be a paper having a grammage in the range of from 15 to 250 g/m². The paper component can also be a cardboard having a grammage in the range of from 150 to 600 g/m², preferably 150 to 400 g/m².

The paper component can be pre-coating with a pre-coating. It is preferred that the paper component is pre-coated on the first side and/or second side with a pre-coating comprising a mineral. For example, the paper component may be a paper, a card stock or a paperboard, which is pre-coated with a pre-coating comprising a mineral.

It has surprisingly been found by the inventors that by using a paper component, preferably a paper or a paperboard, being pre-coated with a mineral the inventive paper article is further improved e.g. in terms of its water resistance, water uptake and/or oil resistance without losing its functionality for heat-sealing to different types of substrates.

The paper component may be partially or fully pre-coated by the heat-sealable coating on its first side and/or second side. In a preferred embodiment, the paper component is fully pre-coated on the first and the second side.

Preferably, the pre-coating comprises calcium carbonate. A suitable calcium carbonate is, for example, ground calcium carbonate, precipitated calcium carbonate or mixtures thereof.

The first side and/or the second side of the paper component is at least partially coated with the heat-sealable coating. A "heat-sealable coating" in the meaning of the present invention is a composition, which becomes suitable for bonding a paper component to a substrate when subjected to temperature of above 50° C., preferably of above 70° C., and optionally pressure.

According to one embodiment, the heat-sealable coating has a seal initiation temperature of above 50° C., preferably of above 70° C., more preferably in the range of 80 to 150° C., even more preferably in the range of 80 to 120° C., and most preferably in the range of 90 to 110° C. According to another embodiment, the heat-sealable coating has a seal initiation temperature of above 50° C., preferably of above 70° C., more preferably in the range of 80 to 150° C., even more preferably in the range of 80 to 120° C., and most preferably in the range of 90 to 110° C., wherein the seal initiation temperature is temperature which needs to be applied to the heat-sealable coating to obtain a seal strength of at least 1 N, preferably of at least 2 N between two substrates. The seal strength is measured by an unsupported 90° T-Peel test with a test specimen having a width of 50 mm. Such tests are known in the art.

In one embodiment, the first side and/or the second side of the paper component is partially coated with the heat-sealable coating. For example, the first side and/or the second side of the paper component can be coated on a specific area of the paper component, which is to be laminated to a substrate by heat-sealing.

In a preferred embodiment, the first side and/or the second side of the paper component is fully coated with the heat-sealable coating. Fully coating one side of the paper component can be advantageous, since it provides the paper article with heat-sealability on the entire side of the article. Furthermore, in case a part of the surface area of the coated article is not subjected to a heat-sealing step, this part of the paper article benefits from further functionality of the heat-sealable coating, for example, an improved water resistance, decreased water uptake and/or improved oil resistance.

In one embodiment, the first side and the second side of the paper component are fully coated with the heat-sealable coating. In another embodiment, the first side of the paper component is fully coated with the heat-sealable coating. In yet another embodiment, the second side of the paper component is fully coated with the heat-sealable coating.

In one embodiment, the first side and the second side of the paper component are partially coated with the heat-sealable coating. In another embodiment, the first side of the paper component is partially coated with the heat-sealable coating. In yet another embodiment, the second side of the paper component is partially coated with the heat-sealable coating.

It is further possible that the first side of the paper component is at least partially, preferably fully coated, with the heat-sealable coating and the second side of the paper component is at least partially, preferably fully coated, with a heat-sealable coating being different from the heat-sealable coating on the first side. Thus, according to one embodiment, the first side of the paper component is at least partially, preferably fully coated, with one heat-sealable coating and the second side of the paper component is at least partially, preferably fully coated, with another heat-sealable coating being different from the heat-sealable coating on the first side.

Furthermore, it is also possible that the first side and/or second side of the paper component is at least partially coated with more than one layer of a heat-sealable coating, wherein each one of the coating layers has the same or a different composition. According to one embodiment, the first side and/or the second side of the paper component is at least partially coated with two or more coating layers of a heat-sealable coating, wherein each one of the coating layers of the heat-sealable coating has the same or a different composition. According to one embodiment, the first side and/or the second side of the paper component is fully coated with two or more coating layers of a heat-sealable coating, wherein each one of the coating layers of the heat-sealable coating has the same or a different composition.

In principle, the heat-sealable coating can be present on the first side and/or the second side of the paper component in any amount, which provides the desired heat-sealing functionality. In a preferred embodiment, the heat-sealable coating is present on the first side and/or the second side of the paper component in an amount of from 1 to 50 g/m², preferably from 2 to 20 g/m², and more preferably from 4 to 10 g/m².

It has surprisingly been found by the inventors that the heat-sealable coating can be present on the paper component in a comparatively low weight amount without losing the desired heat-sealing functionality. Besides needing less resources for its production, the low amount of heat-sealable coating is particularly advantageous for recycling the paper article, or a laminate obtained therefrom, at a later stage.

The inventive paper article comprises a paper component having a first side and a second side, wherein the first side and/or the second side of the paper component is at least partially coated with the heat-sealable coating.

In one embodiment, the heat-sealable coating is obtained by a method comprising the steps of
applying a coating composition, preferably an aqueous coating composition, comprising the first polymer and the second polymer, on at least a part of the first side and/or second side of the paper component, and optionally drying of the coating composition.

In one embodiment, the heat-sealable coating is obtained by a method comprising the steps of
applying a coating composition, preferably an aqueous coating composition, comprising the first polymer and the second polymer, on at least a part of the first side and/or second side of the paper component, and drying of the coating composition.

In one preferred embodiment, the heat-sealable coating is obtained by a method comprising the steps of
applying a coating composition, preferably an aqueous coating composition, comprising the first polymer and the second polymer, on the first side and/or second side of the paper component, and drying of the coating composition.

For example, the coating composition, preferably aqueous coating composition, can be applied by rod coating, blade coating, curtain coating or by printing techniques such as flexographic printing or offset printing. Such methods are known in the art.

Drying means for drying the coating composition can be selected by the skilled person. Suitable drying means are for example, hot air, air jet and/or IR drying.

The heat-sealable coating comprises a first polymer comprising units derived from a (meth)acrylate, and/or (meth)acrylic acid and/or a salt thereof.

Suitable (meth)acrylates are methyl acrylate, ethyl acrylate, butyl acrylate, hexyl acrylate, 2-ethylhexyl acrylate, octyl acrylate and isooctyl acrylate, n-decyl acrylate, isodecyl acrylate, tert-butyl acrylate, methyl methacrylate, butyl methacrylate, hexyl methacrylate, isobutyl methacrylate, isopropyl methacrylate, sec-butyl methacrylate, cyclohexyl methacrylate, isodecyl methacrylate, isobornyl methacrylate, t-butylaminoethyl methacrylate, stearyl methacrylate, glycidyl methacrylate, dicyclopentenyl methacrylate, phenyl methacrylate and 2-hydroxyethyl acrylate.

Preferred (meth)acrylates are methyl acrylate, ethyl acrylate, butyl acrylate, hexyl acrylate, 2-ethylhexyl acrylate, octyl acrylate and isooctyl acrylate, n-decyl acrylate, isodecyl acrylate, tert-butyl acrylate, methyl methacrylate, butyl methacrylate, hexyl methacrylate, isobutyl methacrylate, isopropyl methacrylate and 2-hydroxyethyl acrylate.

More preferred (meth)acrylates are methyl acrylate, ethyl acrylate, butyl acrylate, 2-ethylhexyl acrylate, octyl acrylate, isooctyl acrylate, methyl methacrylate and butyl methacrylate.

According to one embodiment, the heat-sealable coating comprises a first polymer comprising units derived from a (meth)acrylate.

According to one embodiment, the heat-sealable coating comprises a first polymer comprising units derived from (meth)acrylic acid and/or a salt thereof.

According to one preferred embodiment, the heat-sealable coating comprises a first polymer comprising units derived from a (meth)acrylate, and (meth)acrylic acid and/or a salt thereof.

According to one embodiment, the heat-sealable coating comprises a first polymer comprising units derived from a $C_1$-$C_6$-alkyl (meth)acrylate, and (meth)acrylic acid and/or a salt thereof.

According to one embodiment, the heat-sealable coating comprises a first polymer consisting of units derived from at least one (meth)acrylate.

According to one embodiment, the heat-sealable coating comprises a first polymer consisting of units derived from at least one (meth)acrylic acid and/or a salt thereof.

According to one preferred embodiment, the heat-sealable coating comprises a first polymer consisting of units derived from at least one (meth)acrylate, and at least one (meth)acrylic acid and/or a salt thereof.

According to one preferred embodiment, the heat-sealable coating comprises a first polymer consisting of units derived from at least one $C_1$-$C_6$-alkyl (meth)acrylate, and at least one (meth)acrylic acid and/or a salt thereof.

According to one preferred embodiment, the heat-sealable coating comprises a first polymer consisting of units derived from at least one methacrylate, at least one acrylate, and acrylic acid and/or a salt thereof.

According to one preferred embodiment, the heat-sealable coating comprises a first polymer consisting of units derived from at least one $C_1$-$C_6$-alkyl methacrylate, at least one $C_1$-$C_6$-alkyl acrylate, and acrylic acid and/or a salt thereof.

According to one preferred embodiment, the heat-sealable coating comprises a first polymer consisting of units derived from at least one acrylate, and acrylic acid and/or a salt thereof.

According to one preferred embodiment, the heat-sealable coating comprises a first polymer consisting of units derived from at least one $C_1$-$C_6$-alkyl acrylate, and acrylic acid and/or a salt thereof.

According to one preferred embodiment, the first polymer is selected from the group consisting of (meth)acrylate/acrylic acid polymers and salts thereof, poly(meth)acrylic acids and salts thereof, and mixtures thereof, and preferably is a (meth)acrylate/acrylic acid polymer or a salt thereof, and more preferably is a methacrylate/acrylate/acrylic acid polymer or a salt thereof.

According to one preferred embodiment, the first polymer is selected from the group consisting of $C_1$-$C_6$-alkyl (meth) acrylate/acrylic acid polymers and salts thereof, poly(meth) acrylic acids and salts thereof, and mixtures thereof, preferably is a $C_1$-$C_6$-alkyl (meth)acrylate/acrylic acid polymer or a salt thereof, and more preferably is a $C_1$-$C_6$-alkyl methacrylate/$C_1$-$C_6$-alkyl acrylate/acrylic acid polymer or a salt thereof.

According to one more preferred embodiment, the first polymer is selected from the group consisting of (meth) acrylate/acrylic acid polymers and salts thereof, poly(meth) acrylic acids and salts thereof, and mixtures thereof, and preferably is a (meth)acrylate/acrylic acid polymer or a salt thereof, and more preferably is an acrylate/acrylic acid polymer or a salt thereof.

According to one more preferred embodiment, the first polymer is selected from the group consisting of $C_1$-$C_6$-alkyl (meth)acrylate/acrylic acid polymers and salts thereof, poly (meth)acrylic acids and salts thereof, and mixtures thereof, preferably is a $C_1$-$C_6$-alkyl (meth)acrylate/acrylic acid polymer or a salt thereof, and more preferably is a $C_1$-$C_6$-alkyl acrylate/acrylic acid polymer or a salt thereof.

It is to be understood that the term "acrylate" or "methacrylate" includes the option that two or more different acrylates or two or more different methacrylates are used for preparing the polymer. Thus, the term "polymer" can be a homopolymer, a copolymer, a terpolymer, tetrapolymer etc.

The inventors surprisingly found that the use of a first polymer comprising, preferably consisting of, units derived from at least one (meth)acrylate and at least one (meth) acrylic acid (and/or a salt thereof) is particularly suitable (in combination with the second polymer) for providing a coated paper article with very good properties, e.g. in terms of heat-sealability, water resistance, oil resistance, workability etc.

In case the first polymer comprises units derived from (meth)acrylic acid, the first polymer may preferably be present in partially or fully neutralized form. Thus, according to one embodiment, the first polymer is present in partially or fully neutralized form. According to one embodiment, the first polymer is present in partially neutralized form. According to one preferred embodiment, the first polymer is present in fully neutralized form.

According to one preferred embodiment, the heat-sealable coating comprises a first polymer consisting of units derived from at least one (meth)acrylate, at least one (meth)acrylic acid, wherein the first polymer is present in at least partially neutralized form.

According to one more preferred embodiment, the heat-sealable coating comprises a first polymer consisting of units derived from at least one acrylate, and acrylic acid, wherein the first polymer is present in at least partially neutralized form.

According to one preferred embodiment, the heat-sealable coating comprises a first polymer consisting of units derived from at least one $C_1$-$C_6$-alkyl methacrylate, at least one $C_1$-$C_6$-alkyl acrylate, and acrylic acid, wherein the first polymer is present in at least partially neutralized form.

According to one embodiment, the first polymer has a (meth)acrylate, and/or (meth)acrylic acid and/or a salt thereof, content of above 40 wt. %, preferably above 60 wt. %, more preferably above 80 wt. %, even more preferably above 90 wt. %, and most preferably above 95 wt. %, based on the total weight of the first polymer.

In one embodiment, the first polymer further comprises units derived from alpha-olefins, vinyl carboxylates, vinylic N-heterocycles, (meth)acrylonitrile, or mixtures thereof.

Suitable alpha-olefins are, for example, ethylene, propylene, 1-butene, 3-methyl-1-butene, 4-methyl-1-pentene, 3-methyl-1-pentene, 1-heptene, 1-hexene, 1-octene, 1-decene, and 1-dodecene.

Suitable vinyl carboxylates are, for example, vinyl acetate, vinyl propionate, vinyl versatate, and vinyl butyrate.

A "vinylic N-heterocycle" in the meaning of the present invention is a N-heterocycle, which is substituted with a vinyl group on a nitrogen atom of the heterocycle. A suitable vinylic N-heterocycle is N-vinyl pyrrolidone.

The heat-sealable coating comprises a second polymer, being different from the first polymer, comprising units derived from
 a) a (meth)acrylate, and/or (meth)acrylic acid and/or a salt thereof, and
 b) an alkene.

Suitable (meth)acrylates are methyl acrylate, ethyl acrylate, butyl acrylate, hexyl acrylate, 2-ethylhexyl acrylate, octyl acrylate and isooctyl acrylate, n-decyl acrylate, isodecyl acrylate, tert-butyl acrylate, methyl methacrylate, butyl methacrylate, hexyl methacrylate, isobutyl methacrylate, isopropyl methacrylate, sec-butyl methacrylate, cyclohexyl methacrylate, isodecyl methacrylate, isobornyl methacrylate, t-butylaminoethyl methacrylate, stearyl methacrylate, glycidyl methacrylate, dicyclopentenyl methacrylate, phenyl methacrylate and 2-hydroxyethyl acrylate.

Preferred (meth)acrylates are methyl acrylate, ethyl acrylate, butyl acrylate, hexyl acrylate, 2-ethylhexyl acrylate, octyl acrylate and isooctyl acrylate, n-decyl acrylate, isodecyl acrylate, tert-butyl acrylate, methyl methacrylate, butyl methacrylate, hexyl methacrylate, isobutyl methacrylate, isopropyl methacrylate and 2-hydroxyethyl acrylate.

More preferred (meth)acrylates are methyl acrylate, ethyl acrylate, butyl acrylate, 2-ethylhexyl acrylate, octyl acrylate, isooctyl acrylate, methyl methacrylate and butyl methacrylate.

Suitable alkenes are alpha-olefins such as ethylene, propylene, 1-butene, 3-methyl-1-butene, 4-methyl-1-pentene, 3-methyl-1-pentene, 1-heptene, 1-hexene, 1-octene, 1-decene, and 1-dodecene. Most preferably, the alkene is ethylene.

According to one embodiment, the heat-sealable coating comprises a second polymer being different from the first polymer, comprising units derived from
 a) a (meth)acrylate, and
 b) an alkene.

According to one embodiment, the heat-sealable coating comprises a second polymer being different from the first polymer, comprising units derived from
 a) (meth)acrylic acid and/or a salt thereof, and
 b) an alkene.

According to one preferred embodiment, the heat-sealable coating comprises a second polymer being different from the first polymer, comprising units derived from
 a) a (meth)acrylate, and (meth)acrylic acid and/or a salt thereof, and
 b) an alkene.

According to one more preferred embodiment, the heat-sealable coating comprises a second polymer being different from the first polymer, comprising units derived from
 a) (meth)acrylic acid, preferably acrylic acid, and/or a salt thereof, and
 b) an alkene, preferably ethylene.

The heat-sealable coating comprises a second polymer being different from the first polymer, consisting of units derived from
   a) at least one (meth)acrylate, and/or at least one (meth)acrylic acid and/or a salt thereof, and
   b) an alkene.

According to one preferred embodiment, the heat-sealable coating comprises a second polymer being different from the first polymer, comprising units derived from
   a) a (meth)acrylate, and/or a (meth)acrylic acid and/or a salt thereof, and
   b) an alkene, wherein the alkene is an alpha-olefin, preferably ethylene.

According to one preferred embodiment, the heat-sealable coating comprises a second polymer being different from the first polymer, consisting of units derived from
   a) at least one (meth)acrylate, and/or at least one (meth)acrylic acid and/or a salt thereof, and
   b) an alkene, wherein the alkene is an alpha-olefin, preferably ethylene.

According to one more preferred embodiment, the heat-sealable coating comprises a second polymer being different from the first polymer, consisting of units derived from
   a) at least one (meth)acrylic acid, preferably acrylic acid, and/or a salt thereof, and
   b) an alkene, wherein the alkene is an alpha-olefin, preferably ethylene.

In case the second polymer comprises units derived from (meth)acrylic acid, the second polymer may preferably be present in partially or fully neutralized form. Thus, according to one embodiment, the second polymer is present in partially or fully neutralized form. According to one embodiment, the second polymer is present in partially neutralized form. According to one preferred embodiment, the second polymer is present in fully neutralized form.

The second polymer may have a specific comonomer content of (meth)acrylic acid. Preferably, the second polymer has a comonomer content of (meth)acrylic acid in the range from 0.5 to 25%, preferably from 15 to 25%, more preferably from 15 to 22%. The comonomer content of (meth)acrylic acid in the second polymer may be expressed in terms of mole percent. For example, the second polymer may be an ethylene acrylic acid (EAA) derived from ethylene and acrylic acid in a molar ratio of 4:1 has a comonomer content of acrylic acid of 20 mol-%.

According to one preferred embodiment, the comonomer content of (meth)acrylic acid in the second polymer is in the range from 0.5 to 25 mol-%, preferably from 15 to 25 mol-%, more preferably from 15 to 22 mol-%. According to one preferred embodiment, the second polymer has a comonomer content of acrylic acid in the range of from 0.5 to 25 mol-%, preferably from 15 to mol-%, more preferably from 15 to 22 mol-%. For example, the second polymer can have a comonomer content of acrylic acid of about 17 mol-% or about 20 mol-%.

According to one more preferred embodiment, the heat-sealable coating comprises a second polymer being different from the first polymer, consisting of units derived from
   a) at least one (meth)acrylic acid, preferably acrylic acid, and/or a salt thereof, and
   b) an alkene, wherein the alkene is an alpha-olefin, preferably ethylene,
   wherein the second polymer has a comonomer content of (meth)acrylic acid, preferably acrylic acid, in the range of from 0.5 to 25 mol-%, preferably from 15 to mol-%, more preferably from 15 to 22 mol-%.

According to one preferred embodiment, the heat-sealable coating comprises a second polymer being different from the first polymer, comprising units derived from
   a) a (meth)acrylate and a (meth)acrylic acid, and
   b) an alkene, wherein the alkene is an alpha-olefin, preferably ethylene,
   wherein the second polymer is at least partially neutralized.

According to one more preferred embodiment, the heat-sealable coating comprises a second polymer being different from the first polymer, comprising units derived from
   a) a (meth)acrylic acid, preferably acrylic acid, and
   b) an alkene, wherein the alkene is an alpha-olefin, preferably ethylene,
   wherein the second polymer is at least partially neutralized.

According to one preferred embodiment, the heat-sealable coating comprises a second polymer being different from the first polymer, consisting of units derived from
   a) at least one (meth)acrylate and at least one (meth)acrylic acid, and
   b) an alkene, wherein the alkene is an alpha-olefin, preferably ethylene,
   wherein the second polymer is at least partially neutralized.

According to one more preferred embodiment, the heat-sealable coating comprises a second polymer being different from the first polymer, consisting of units derived from
   a) at least one (meth)acrylic acid, preferably acrylic acid, and
   b) an alkene, wherein the alkene is an alpha-olefin, preferably ethylene,
   wherein the second polymer is at least partially neutralized.

According to one preferred embodiment, the second polymer is selected from the group consisting of ethylene/(meth)acrylate polymers, ethylene/(meth)acrylate/(meth)acrylic acid polymers and salts thereof, ethylene/(meth)acrylic acid polymers and salts thereof, and mixtures thereof, preferably is an ethylene/(meth)acrylate/(meth)acrylic acid polymer or a salt thereof, and more preferably is an ethylene/methacrylate/acrylate/acrylic acid polymer or a salt thereof.

For example, suitable ethylene/(meth)acrylate polymers are ethylene ethyl acrylate, ethylene methyl acrylate, ethylene butyl acrylate. According to one preferred embodiment, the second polymer is an ethylene/$C_1$-$C_6$-alkyl (meth)acrylate/(meth)acrylic acid polymer or a salt thereof, and more preferably is an ethylene/$C_1$-$C_6$-alkyl methacrylate/$C_1$-$C_6$-alkyl acrylate/acrylic acid polymer or a salt thereof.

According to one more preferred embodiment, the second polymer is selected from the group consisting of ethylene/(meth)acrylate polymers, ethylene/(meth)acrylate/(meth)acrylic acid polymers and salts thereof, ethylene/(meth)acrylic acid polymers and salts thereof, and mixtures thereof, preferably is an ethylene/(meth)acrylic acid polymer or a salt thereof, and more preferably is an ethylene/acrylic acid polymer or a salt thereof.

According to one preferred embodiment, the heat-sealable coating comprises a first polymer comprising units derived from a (meth)acrylate, and/or (meth)acrylic acid and/or a salt thereof, and a second polymer being different from the first polymer, comprising units derived from
   a) a (meth)acrylate and/or a (meth)acrylic acid and/or a salt thereof, and
   b) an alkene, wherein the alkene is ethylene.

According to one embodiment, the heat-sealable coating comprises a first polymer comprising units derived from a (meth)acrylate, and (meth)acrylic acid and/or a salt thereof, and a second polymer being different from the first polymer, comprising units derived from
   a) a (meth)acrylate and a (meth)acrylic acid and/or a salt thereof, and
   b) an alkene, wherein the alkene is ethylene.

According to one preferred embodiment, the heat-sealable coating comprises a first polymer comprising units derived from a (meth)acrylate, preferably an acrylate, and (meth)acrylic acid, preferably acrylic acid, and/or a salt thereof, and a second polymer being different from the first polymer, comprising units derived from
   a) (meth)acrylic acid, preferably acrylic acid, and/or a salt thereof, and
   b) an alkene, wherein the alkene is ethylene.

According to one embodiment, the heat-sealable coating comprises a first polymer consisting of units derived from at least one (meth)acrylate, and at least one (meth)acrylic acid and/or a salt thereof, and a second polymer being different from the first polymer, consisting of units derived from
   a) at least one (meth)acrylate and at least one (meth)acrylic acid and/or a salt thereof, and
   b) an alkene, wherein the alkene is ethylene.

According to one preferred embodiment, the heat-sealable coating comprises a first polymer consisting of units derived from at least one (meth)acrylate, preferably at least one acrylate, and at least one (meth)acrylic acid, preferably acrylic acid, and/or a salt thereof, and a second polymer being different from the first polymer, consisting of units derived from
   a) at least one (meth)acrylic acid, preferably acrylic acid, and/or a salt thereof, and
   b) an alkene, wherein the alkene is ethylene.

The first polymer and the second polymer are present in the heat-sealable coating in a weight ratio of 90:10 to 35:65.

According to a preferred embodiment, the first polymer and the second polymer are present in the heat-sealable coating in a weight ratio of 90:10 to 45:55, preferably in a weight ratio of 90:10 to 55:45, more preferably 85:15 to 65:35, and most preferably 85:15 to 75:25.

According to a preferred embodiment, the first polymer and the second polymer are present in the heat-sealable coating in a weight ratio of 85:15 to 35:65, preferably in a weight ratio of 75:25 to 45:55, more preferably 65:35 to 45:55.

It has been found that by including the first polymer and the second polymer into the heat-sealable coating in specific weight ratios, the properties, in particular the heat-sealing properties, of the inventive paper article can be further improved.

The first polymer and the second polymer are present in the heat-sealable coating in an overall amount of at least 50 wt. %, based on the total weight of the coating.

In a preferred embodiment, the first polymer and the second polymer are present in the heat-sealable coating in an overall amount of at least 60 wt. %, preferably at least 70 wt. %, more preferably at least 80 wt. %, and most preferably at least 85 wt. %, based on the total weight of the coating.

In addition to the first polymer and the second polymer, the heat-sealable coating can comprise further components.

In one preferred embodiment, the heat-sealable coating further comprises a wax in an amount of from 0.1 to 20 wt. %, preferably 1 to 20 wt. %, more preferably 5 to 15 wt. %, and most preferably 5 to 10 wt. %, based on the total weight of the coating.

It has been found by the inventors that the addition of a certain amount of a wax to the heat-sealable coating allows for improving the water resistance and/or water barrier properties without leading to a loss of heat-sealability of the paper article to different substrates.

Preferably, the wax is selected from the group consisting of plant waxes, animal waxes, hydrocarbon waxes, and mixtures thereof. It is more preferred that the wax is a hydrocarbon wax, and most preferably the wax is a paraffin wax.

The plant wax may be modified or unmodified. A suitable plant wax is e.g. carnauba wax, jojoba oil, candelilla wax or ouricury wax.

The animal wax may also be modified or unmodified. A suitable animal wax is e.g. wool wax, beeswax or china wax.

Preferably, the wax is a hydrocarbon wax. A suitable hydrocarbon wax is a paraffin wax or a polyolefin wax such as a polyethylene wax. A "paraffin wax" in the meaning of the present invention is a compound derived from petroleum, coal or shale oil, which consists of a mixture of hydrocarbons, preferably hydrocarbons containing from 20 to 40 carbon atoms, and which is solid at 25° C. and begins to melt at a temperature in the range of 40 to 90° C., preferably 60 to 80° C.

In a preferred embodiment, the first polymer and the second polymer are present in the heat-sealable coating in an overall amount of at least 60 wt. %, preferably at least 70 wt. %, more preferably at least 80 wt. %, and most preferably at least 85 wt. %, and the heat-sealable coating further comprises a wax in an amount of from 0.1 to 20 wt. %, preferably 1 to 20 wt. %, more preferably 5 to 15 wt. %, and most preferably 5 to 10 wt. %, based on the total weight of the coating.

In one embodiment, the first polymer and the second polymer can be present in the heat-sealable coating in an overall amount of at least 85 wt. %, and the heat-sealable coating further comprises a wax in an amount of from 5 to 15 wt. %, preferably 5 to 10 wt. %, based on the total weight of the coating.

In another embodiment, the heat-sealable coating further comprises a mineral material in an amount of from 0.1 to 49 wt. %, preferably 1 to 35 wt. %, more preferably 10 to 30 wt. %, and most preferably 15 to 25 wt. %, based on the total weight of the coating.

It has been surprisingly found by the inventors that the addition of mineral material to the heat-sealable coating allows for modifying the seal strength of the paper article to the substrate. In particular, the addition of the mineral material can lead to a controlled decrease of seal strength in a laminate obtained from heat-sealing the paper article to a substrate. Certain applications of paper-based laminates require a very specific seal strength between the paper component and the heat-sealed substrate of the laminate in order to avoid a breakage or failure of the adherent base material (paper component or the substrate) when the heat-sealing is deliberately broken e.g. by a customer who opens a package. In addition thereto, the use of a mineral material, preferably calcium carbonate, may decrease the blocking of the inventive paper article when e.g. wound up in a roll. Furthermore, the use of a mineral material can provide a more cost efficient composition, which still provides the desired heat-sealing functionality.

A suitable mineral material is, for example, talc, a calcium carbonate-containing mineral (e.g. calcium carbonate), clay (e.g. kaolin clay), an aluminum-containing mineral (e.g. aluminum oxide) or a silica. Preferably, the mineral material is a calcium carbonate-containing mineral such as natural ground calcium carbonate, a precipitated calcium carbonate, or a mixture thereof.

In a preferred embodiment, the mineral material is a natural ground calcium carbonate. Preferably, the natural ground calcium carbonate is selected from the group consisting of chalk, limestone, marble, dolomite and mixtures thereof. In another preferred embodiment, the natural ground calcium carbonate is selected from the group consisting of chalk, limestone or marble. More preferably, the natural ground calcium carbonate is limestone or marble, and most preferably is marble.

A natural ground calcium carbonate may be obtained, for example, in a wet and/or dry comminution step, such as crushing and/or grinding, from natural calcium carbonate-containing minerals (e.g. chalk, limestone, marble or dolomite). According to one embodiment, the natural ground calcium carbonate is a wet-natural ground calcium carbonate. In another embodiment, the natural ground calcium carbonate is a dry-natural ground calcium carbonate.

In one embodiment, the calcium carbonate-containing mineral is a precipitated calcium carbonate. "Precipitated calcium carbonate" (PCC) in the meaning of the present invention is a synthesized material, generally obtained by precipitation following reaction of carbon dioxide and calcium hydroxide in an aqueous environment or by precipitation of calcium and carbonate ions, for example $CaCl_2$) and $Na_2CO_3$, out of solution. Further possible ways of producing PCC are the lime soda process, or the Solvay process in which PCC is a by-product of ammonia production. Precipitated calcium carbonate exists in three primary crystalline forms: calcite, aragonite and vaterite, and there are many different polymorphs (crystal habits) for each of these crystalline forms. Calcite has a trigonal structure with typical crystal habits such as scalenohedral (S-PCC), rhombohedral (R-PCC), hexagonal prismatic, pinacoidal, colloidal (C-PCC), cubic, and prismatic (P-PCC). Aragonite is an orthorhombic structure with typical crystal habits of twinned hexagonal prismatic crystals, as well as a diverse assortment of thin elongated prismatic, curved bladed, steep pyramidal, chisel shaped crystals, branching tree, and coral or worm-like form. Vaterite belongs to the hexagonal crystal system. The obtained PCC slurry can be mechanically dewatered and dried.

According to one embodiment, the precipitated calcium carbonate is precipitated calcium carbonate, preferably comprising aragonitic, vateritic or calcitic mineralogical crystal forms or mixtures thereof.

It is further preferred that the calcium carbonate-containing mineral has a specific particle size distribution. In a preferred embodiment, the calcium carbonate-containing mineral has a weight-median particle size $d_{50}$ in the range of from 0.1 to 20 µm, preferably in the range of from 0.1 to 10 µm, more preferably 0.3 to 5 µm, even more preferably from 0.5 to 4 µm, and most preferably from 0.7 to 2 µm.

In another preferred embodiment, the calcium carbonate-containing mineral has a weight-based top cut particle size $d_{98}$ in the range of from 1 to 50 µm, preferably in the range of from 1 to 20 µm, more preferably 1 to 12 µm, even more preferably from 1 to 10 µm.

In a preferred embodiment, the calcium carbonate-containing mineral has a weight-median particle size $d_{50}$ in the range of from 0.1 to 20 µm, preferably in the range of from 0.1 to 10 µm, more preferably 0.3 to 5 µm, even more preferably from 0.5 to 4 µm, and most preferably from 0.7 to 2 µm and a weight-based top cut particle size $d_{98}$ in the range of from 1 to 50 µm, preferably in the range of from 1 to 20 µm, more preferably 1 to 12 µm, even more preferably from 1 to 10 µm.

In another preferred embodiment, the calcium carbonate-containing mineral is a natural ground calcium carbonate having a weight-median particle size $d_{50}$ in the range of from 0.1 to 20 µm, preferably in the range of from 0.1 to 10 µm, more preferably 0.3 to 5 µm, even more preferably from 0.5 to 4 µm, and most preferably from 0.7 to 2 µm.

In another preferred embodiment, the calcium carbonate-containing mineral is a natural ground calcium carbonate having a weight-based top cut particle size $d_{98}$ in the range of from 1 to 50 µm, preferably in the range of from 1 to 20 µm, more preferably 1 to 12 µm, even more preferably from 1 to 10 µm.

In another preferred embodiment, the calcium carbonate-containing mineral is a natural ground calcium carbonate having a weight-median particle size $d_{50}$ in the range of from 0.1 to 20 µm, preferably in the range of from 0.1 to 10 µm, more preferably 0.3 to 5 µm, even more preferably from 0.5 to 4 µm, and most preferably from 0.7 to 2 µm, and a weight-based top cut particle size $d_{98}$ in the range of from 1 to 50 µm, preferably in the range of from 1 to 20 µm, more preferably 1 to 12 µm, even more preferably from 1 to 10 µm.

In another preferred embodiment, the calcium carbonate-containing mineral is a precipitated calcium carbonate having a weight-median particle size $d_{50}$ in the range of from 0.1 to 20 µm, preferably in the range of from 0.1 to 10 µm, more preferably 0.3 to 5 µm, even more preferably from 0.5 to 4 µm, and most preferably from 0.7 to 2 µm.

In another preferred embodiment, the calcium carbonate-containing mineral is a precipitated calcium carbonate having a weight-based top cut particle size $d_{98}$ in the range of from 1 to 50 µm, preferably in the range of from 1 to 20 µm, more preferably 1 to 12 µm, even more preferably from 1 to 10 µm.

In another preferred embodiment, the calcium carbonate-containing mineral is a precipitated calcium carbonate having a weight-median particle size $d_{50}$ in the range of from 0.1 to 20 µm, preferably in the range of from 0.1 to 10 µm, more preferably 0.3 to 5 µm, even more preferably from 0.5 to 4 µm, and most preferably from 0.7 to 2 µm, and a weight-based top cut particle size $d_{98}$ in the range of from 1 to 50 µm, preferably in the range of from 1 to 20 µm, more preferably 1 to 12 µm, even more preferably from 1 to 10 µm.

In another preferred embodiment, the heat-sealable coating comprises a wax in an amount of from 0.1 to 20 wt. %, preferably 1 to 20 wt. %, more preferably 5 to 15 wt. %, and most preferably 5 to 10 wt. %, and a mineral material in an amount of from 0.1 to 49 wt. %, preferably 1 to 35 wt. %, more preferably 10 to 30 wt. %, and most preferably 15 to 25 wt. %, based on the total weight of the coating.

In one embodiment, the heat-sealable coating comprises a wax in an amount of from 5 to 15 wt. %, preferably 5 to 10 wt. %, and a mineral material in an amount of from 1 to 35 wt. %, more preferably 10 to 30 wt. %, and most preferably 15 to 25 wt. %, based on the total weight of the coating.

In another embodiment, the heat-sealable coating comprises a wax in an amount of from 5 to 15 wt. %, preferably 5 to 10 wt. %, and a mineral material in an amount of from 15 to 35 wt. %, preferably of from 25 to 35 wt. %, based on the total weight of the coating.

Furthermore, the heat-sealable coating may contain additives such as a rheology modifier, a viscosity enhancer and/or an antifoaming agent. According to one embodiment, the heat-sealable coating further comprises at least one additive, preferably a rheology modifier, a viscosity enhancer and/or an antifoaming agent.

According to one embodiment, the heat-sealable coating further comprises at least one additive, preferably a rheology modifier, a viscosity enhancer and/or an antifoaming agent, wherein the at least one additive is present in the heat-sealable coating in an amount of from 0.05 to 3.0 wt. %, preferably from 0.1 to 2.0 wt. %, more preferably from 0.2 to 1.0 wt. %, based on the total weight of the coating.

According to a preferred embodiment of the present invention, the paper component is a paper or a paperboard, preferably having a grammage in the range of from 15 to 400 g/m$^2$, more preferably from 50 to 350 g/m$^2$, and most preferably 100 to 300 g/m$^2$, wherein the first side and/or the second side of the paper component is at least partially, preferably fully, coated with a heat-sealable coating, the heat-sealable coating comprises a first polymer comprising units derived from a (meth)acrylate, and/or (meth)acrylic acid and/or a salt thereof, and a second polymer, being different from the first polymer, comprising units derived from a) a (meth)acrylate, and/or (meth)acrylic acid and/or a salt thereof, and b) an alkene, preferably ethylene, wherein the first polymer and the second polymer are present in the heat-sealable coating in a weight ratio of 90:10 to 35:65, and wherein the first polymer and the second polymer are present in the heat-sealable coating in an overall amount of at least 50 wt. %, based on the total weight of the coating.

According to a preferred embodiment of the present invention, the paper component is a paper or a paperboard, preferably having a grammage in the range of from 15 to 400 g/m$^2$, more preferably from 50 to 350 g/m$^2$, and most preferably 100 to 300 g/m$^2$, wherein the first side and/or the second side of the paper component is at least partially, preferably fully, coated with a heat-sealable coating, the heat-sealable coating comprises a first polymer consisting of units derived from at least one (meth)acrylate, and/or at least one (meth)acrylic acid and/or a salt thereof, and a second polymer, being different from the first polymer, comprising units derived from a) a (meth)acrylate, and/or (meth)acrylic acid and/or a salt thereof, and b) an alkene, preferably ethylene, wherein the first polymer and the second polymer are present in the heat-sealable coating in a weight ratio of 90:10 to 35:65, and wherein the first polymer and the second polymer are present in the heat-sealable coating in an overall amount of at least 50 wt. %, based on the total weight of the coating.

According to a preferred embodiment of the present invention, the paper component is a paper or a paperboard, preferably having a grammage in the range of from 15 to 400 g/m$^2$, more preferably from 50 to 350 g/m$^2$, and most preferably 100 to 300 g/m$^2$, wherein the first side and/or the second side of the paper component is at least partially, preferably fully, coated with a heat-sealable coating, the heat-sealable coating comprises a first polymer consisting of units derived from at least one (meth)acrylate, and at least one (meth)acrylic acid and/or a salt thereof, and a second polymer, being different from the first polymer, comprising units derived from a) a (meth)acrylate, and (meth)acrylic acid and/or a salt thereof, and b) an alkene, preferably ethylene, wherein the first polymer and the second polymer are present in the heat-sealable coating in a weight ratio of 90:10 to 35:65, and wherein the first polymer and the second polymer are present in the heat-sealable coating in an overall amount of at least 50 wt. %, based on the total weight of the coating.

According to a more preferred embodiment of the present invention, the paper component is a paper or a paperboard, preferably having a grammage in the range of from 15 to 400 g/m$^2$, more preferably from 50 to 350 g/m$^2$, and most preferably 100 to 300 g/m$^2$, wherein the first side and/or the second side of the paper component is at least partially, preferably fully, coated with a heat-sealable coating, the heat-sealable coating comprises a first polymer consisting of units derived from at least one (meth)acrylate, preferably at least one acrylate, and at least one (meth)acrylic acid, preferably acrylic acid, and/or a salt thereof, and a second polymer, being different from the first polymer, comprising units derived from a) a (meth)acrylic acid, preferably acrylic acid, and/or a salt thereof, and b) an alkene, preferably ethylene, wherein the first polymer and the second polymer are present in the heat-sealable coating in a weight ratio of 90:10 to 35:65, and wherein the first polymer and the second polymer are present in the heat-sealable coating in an overall amount of at least 50 wt. %, based on the total weight of the coating.

According to a preferred embodiment of the present invention, the paper component is a paper or a paperboard, preferably having a grammage in the range of from 15 to 400 g/m$^2$, more preferably from 50 to 350 g/m$^2$, and most preferably 100 to 300 g/m$^2$, wherein the first side and/or the second side of the paper component is at least partially, preferably fully, coated with a heat-sealable coating, the heat-sealable coating comprises a first polymer consisting of units derived from at least one (meth)acrylate, and/or at least one (meth)acrylic acid and/or a salt thereof, and a second polymer, being different from the first polymer, consisting of units derived from a) at least one (meth)acrylate, and/or at least one (meth)acrylic acid and/or a salt thereof, and b) an alkene, preferably ethylene, wherein the first polymer and the second polymer are present in the heat-sealable coating in a weight ratio of 90:10 to 35:65, and wherein the first polymer and the second polymer are present in the heat-sealable coating in an overall amount of at least 50 wt. %, based on the total weight of the coating.

According to a preferred embodiment of the present invention, the paper component is a paper or a paperboard, preferably having a grammage in the range of from 15 to 400 g/m$^2$, more preferably from 50 to 350 g/m$^2$, and most preferably 100 to 300 g/m$^2$, wherein the first side and/or the second side of the paper component is at least partially, preferably fully, coated with a heat-sealable coating, the heat-sealable coating comprises a first polymer consisting of units derived from at least one (meth)acrylate, and at least one (meth)acrylic acid and/or a salt thereof, and a second polymer, being different from the first polymer, consisting of units derived from a) at least one (meth)acrylate, and at least one (meth) acrylic acid and/or a salt thereof, and b) an alkene, wherein the alkene is ethylene, wherein the first polymer and the second polymer are present in the heat-sealable coating in a weight ratio of 90:10 to 35:65, and wherein the first polymer and the second polymer are present in the heat-sealable coating in an overall amount of at least 50 wt. %, based on the total weight of the coating.

According to a more preferred embodiment of the present invention, the paper component is a paper or a paperboard, preferably having a grammage in the range of from 15 to 400 g/m², more preferably from 50 to 350 g/m², and most preferably 100 to 300 g/m², wherein the first side and/or the second side of the paper component is at least partially, preferably fully, coated with a heat-sealable coating, the heat-sealable coating comprises a first polymer consisting of units derived from at least one (meth)acrylate, preferably at least one acrylate, and at least one (meth)acrylic acid, preferably acrylic acid, and/or a salt thereof, and a second polymer, being different from the first polymer, consisting of units derived from a) at least one (meth)acrylic acid, preferably acrylic acid, and/or a salt thereof, and b) an alkene, wherein the alkene is ethylene, wherein the first polymer and the second polymer are present in the heat-sealable coating in a weight ratio of 90:10 to 35:65, and wherein the first polymer and the second polymer are present in the heat-sealable coating in an overall amount of at least 50 wt. %, based on the total weight of the coating.

According to a preferred embodiment of the present invention, the paper component is a paper or a paperboard, preferably having a grammage in the range of from 15 to 400 g/m², more preferably from 50 to 350 g/m², and most preferably 100 to 300 g/m², wherein the first side and/or the second side of the paper component is at least partially, preferably fully, coated with a heat-sealable coating, the heat-sealable coating comprises a first polymer consisting of units derived from at least one (meth)acrylate, and/or at least one (meth)acrylic acid and/or a salt thereof, and a second polymer, being different from the first polymer, consisting of units derived from a) at least one (meth)acrylate, and/or at least one (meth) acrylic acid and/or a salt thereof, and b) an alkene, wherein the alkene is ethylene, wherein the first polymer and the second polymer are present in the heat-sealable coating in a weight ratio of 90:10 to 35:65, and wherein the first polymer and the second polymer are present in the heat-sealable coating in an overall amount of at least 80 wt. %, preferably at least 85 wt. %, wt. %, and wherein the heat-sealable coating further comprises a wax, preferably a paraffin wax, in an amount of from 5 to 15 wt. %, preferably 5 to 10 wt. %, based on the total weight of the coating.

According to a preferred embodiment of the present invention, the paper component is a paper or a paperboard, preferably having a grammage in the range of from 15 to 400 g/m², more preferably from 50 to 350 g/m², and most preferably 100 to 300 g/m², wherein the first side and/or the second side of the paper component is at least partially, preferably fully, coated with a heat-sealable coating, the heat-sealable coating comprises a first polymer consisting of units derived from at least one (meth)acrylate, and/or at least one (meth)acrylic acid and/or a salt thereof, and a second polymer, being different from the first polymer, consisting of units derived from a) at least one (meth)acrylate, and/or at least one (meth)acrylic acid and/or a salt thereof, and b) an alkene, wherein the alkene is ethylene, wherein the first polymer and the second polymer are present in the heat-sealable coating in a weight ratio of 90:10 to 35:65, and wherein the first polymer and the second polymer are present in the heat-sealable coating in an overall amount of at least 50 wt. %, based on the total weight of the coating, wherein the heat-sealable coating further comprises a wax, preferably a paraffin wax, in an amount of from 5 to 15 wt. %, preferably 5 to 10 wt. %, and wherein the heat-sealable coating further comprises a mineral material, preferably a calcium carbonate, in an amount of from 0.1 to 49 wt. %, preferably 1 to 35 wt. %, more preferably 10 to 30 wt. %, and most preferably 15 to 25 wt. %, based on the total weight of the coating.

According to a preferred embodiment of the present invention, the paper component is a paper or a paperboard, preferably having a grammage in the range of from 15 to 400 g/m², more preferably from 50 to 350 g/m², and most preferably 100 to 300 g/m², wherein the first side and/or the second side of the paper component is at least partially, preferably fully, coated with a heat-sealable coating, the heat-sealable coating comprises a first polymer consisting of units derived from at least one (meth)acrylate, and/or at least one (meth)acrylic acid and/or a salt thereof, and a second polymer, being different from the first polymer, consisting of units derived from a) at least one (meth)acrylate, and/or at least one (meth)acrylic acid and/or a salt thereof, and b) an alkene, wherein the alkene is ethylene, wherein the first polymer and the second polymer are present in the heat-sealable coating in a weight ratio of 90:10 to 35:65, and wherein the first polymer and the second polymer are present in the heat-sealable coating in an overall amount of at least 50 wt. %, based on the total weight of the coating, wherein the heat-sealable coating further comprises a wax, preferably a paraffin wax, in an amount of from 5 to 15 wt. %, preferably 5 to 10 wt. %, and wherein the heat-sealable coating further comprises a mineral material, preferably a calcium carbonate, in an amount of from 0.1 to 49 wt. %, preferably 1 to 35 wt. %, more preferably 10 to 30 wt. %, and most preferably 15 to 25 wt. %, based on the total weight of the coating, wherein the mineral material is a natural ground calcium carbonate having a weight-median particle size $d_{50}$ in the range of from 0.1 to 20 μm, preferably in the range of from 0.1 to 10 μm, more preferably 0.3 to 5 μm, even more preferably from 0.5 to 4 μm, and most preferably from 0.7 to 2 μm, and/or a weight-based top cut particle size $d_{98}$ in the range of from 1 to 50 μm, preferably in the range of from 1 to 20 µm, more preferably 1 to 12 µm, even more preferably from 1 to 10 µm.

The Laminate

In another aspect, the present invention refers to a laminate comprising a substrate, a paper component, and a heat-seal layer being present between the paper component and the substrate, wherein the laminate is obtained by heat-sealing a paper article according to the present invention to the substrate.

The inventors surprisingly found that the substrate to which the paper component is bonded by the heat-seal layer is not limited to one, or a few, specific substrates. In particular, it has been found that by using the specific heat-sealable coating, the paper article can be heat-sealed to itself, to a polar substrate such as a biopolymer or to a nonpolar substrate such as a polyolefin.

The laminate comprises a substrate.

The substrate is not particularly limited and may be, for example, a metal, a cellulose-based substrate, a nonwoven material or a polymer. The metal may be a metal foil, for example, an aluminum foil. The cellulose-based substrate may be a wood substrate or a paper substrate.

According to one embodiment, the substrate is a wood substrate. A suitable wood is for example a fiber board product, preferably a high-density fiber (HDF) board, medium density fiber (MDF) board, low-density fiber (LDF) board, or particle board. Suitable wood fibers or particles may be obtained from primary wood sources, such as softwood tree species, hardwood tree species, or secondary wood sources, such as recycled wood, and mixtures thereof. Such wood materials are well-known to the skilled person.

According to another embodiment, the substrate is a paper substrate. The paper substrate is not limited to a specific paper substrate. Suitable paper substrates are, for example, fine paper, paper, recycled paper, paperboard, corrugated paperboard, card stock or tissue paper.

In a preferred embodiment, the substrate is a paper substrate selected from the group of a paper, a card stock or a paperboard.

In another preferred embodiment, the substrate is a paper substrate having a grammage in the range of from 15 to 400 $g/m^2$, more preferably from 50 to 350 $g/m^2$, and most preferably 100 to 300 $g/m^2$.

In another preferred embodiment, the substrate is a paper, a card stock or a paperboard having a grammage in the range of from 15 to 400 $g/m^2$, more preferably from 50 to 350 $g/m^2$, and most preferably 100 to 300 $g/m^2$.

For example, the substrate can be a paper having a grammage in the range of from 15 to 250 $g/m^2$. The substrate can also be a cardboard having a grammage in the range of from 150 to 600 $g/m^2$, preferably 150 to 400 $g/m^2$.

In another embodiment, the paper substrate, preferably a paper or a paperboard, is pre-coated with a pre-coating, preferably the pre-coating comprises a mineral (e.g. calcium carbonate).

In another preferred embodiment, the substrate is a paper substrate, wherein the paper substrate is coated with a heat-sealable coating as described herein. According to a preferred embodiment, the substrate is a heat-sealable coating as described herein, wherein the heat sealable coating is coated on a paper component.

The substrate may be a paper substrate which is identical to the paper component being at least partially coated with the heat-sealable coating. Thus, in one embodiment, the laminate comprises a substrate, a paper component, and a heat-seal layer being present between the paper component and the substrate, wherein the laminate is obtained by heat-sealing the paper article according to the present invention to the substrate, and wherein the substrate is a paper substrate which is identical to the paper component of the paper article. In one embodiment, the paper component and the substrate is the same material.

It is further possible that the substrate is part of the paper article according to the present invention, i.e. the paper article is heat-sealed to itself. If the paper article is heat-sealed to itself, the part of the paper article serving as the substrate can be coated with the heat-sealable coating or can be without heat-sealable coating.

Figures 5A, 5B, 5C, 5D:
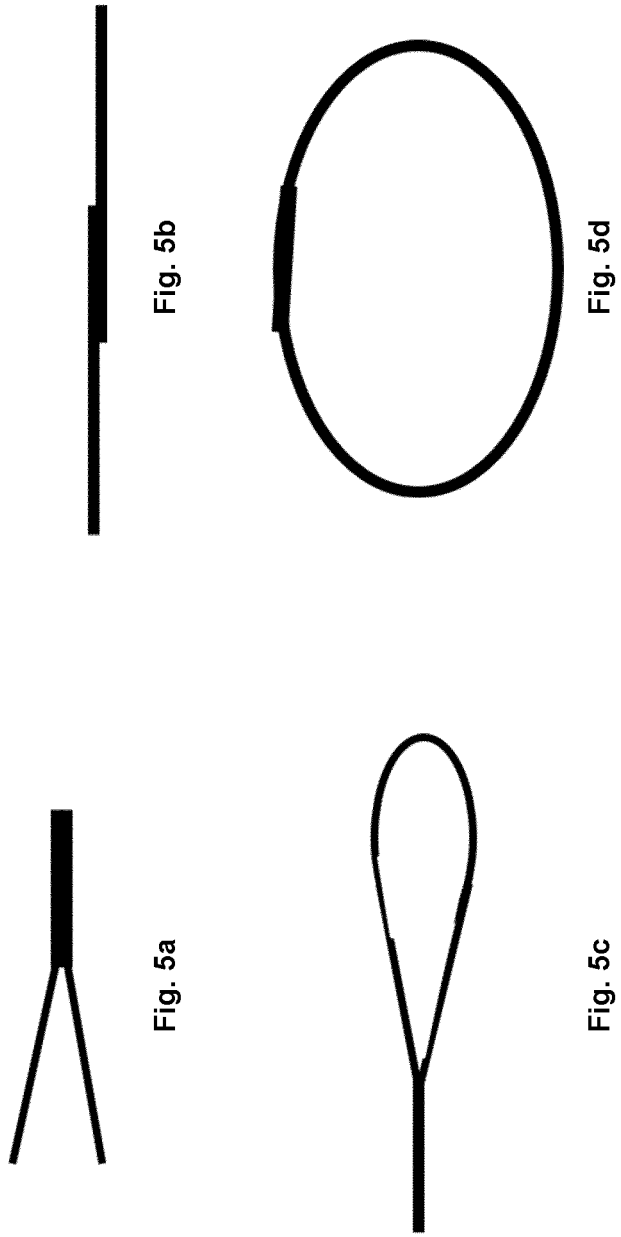

In one embodiment, the substrate is a part of the paper article. For example, the substrate may be a part of the paper article, which is not coated by the heat-sealable coating. However, the substrate may also be a part of the paper article which is coated by the heat-sealable coating. In such case, the heat-sealing is carried out by heat-sealing one part of the heat-sealable coating of the paper article against the heat-sealable coating of another part of the heat-sealable coating of the paper article. Examples for a laminate obtained by heat-sealing the paper article to itself are shown in FIGS. 5c and 5d.

According to one embodiment, the laminate comprises a substrate, a paper component and a heat-seal layer being present between the paper component and the substrate, wherein the laminate is obtained by heat-sealing the paper article of the present invention to the substrate, and wherein the substrate is part of the paper article.

According to one embodiment, the laminate comprises a substrate, a paper component and a heat-seal layer being present between the paper component and the substrate, wherein the laminate is obtained by heat-sealing the paper article of the present invention to the substrate, wherein the substrate is part of the paper article being coated with the heat-sealable coating.

According to one embodiment, the laminate comprises a substrate, a paper component and a heat-seal layer being present between the paper component and the substrate, wherein the laminate is obtained by heat-sealing the paper article of the present invention to the substrate, wherein the substrate is a heat-sealable coating being coated on the paper article.

According to another embodiment, the substrate is a polymer. The polymer may be a polymer sheet or a polymer film, optionally provided in form of a composite material, e.g. wherein the polymer sheet or polymer film is coated to a base material (e.g. a paper or paperboard).

The polymer may be a polar polymer or a nonpolar polymer.

According to one embodiment, the substrate is a polar polymer selected from the group consisting of polyesters, polyvinylchlorides, polyamides, polycarbonates, polyacrylic nitriles, poly(meth)acrylic acids, poly(meth)acrylates, polyvinyl acetates, and polymers comprising such polar polymers, and mixtures thereof. Such materials are known in the art.

According to a preferred embodiment, the polar polymer is a polyester. The polyester can be selected from the group consisting of polycarbonates, terephthalic acid-derived polyesters, polyethylene naphthalate, polylactic acid, polyhydroxyalkanoates, furandicarboxylic acid-based polyester, copolymers thereof, and mixtures thereof. Terephthalic acid-derived polyesters are for example polybutylene terephthalate or polyethylene terephthalate. Polyhydroxyalkanoates are for example poly(3-hydroxypropionate), poly(3-hydroxybutyrate), poly(3-hydroxyvalerate). Suitable furandicarboxylic acid-based polyester are based on e.g. furan-2,5-dicarboxylic acid. A preferred furandicarboxylic acid polyester is polyethylene 2,5-furandicarboxylic acid.

According to another preferred embodiment, the polar polymer is a biodegradable polymer, preferably a biodegradable polyester. A "biodegradable polymer" is a polymer which can be decomposed by enzymatic reaction, preferably in bacteria.

According to another preferred embodiment, the polar polymer is a biopolymer, preferably a bio-polyester. A "biopolymer" is a polymer produced from renewable biomass, for example, vegetable fats and oils, corn starch, straw, woodchips, sawdust or recycled food waste.

According to a more preferred embodiment, the polar polymer is a polylactic acid, a polyhydroxyalkanoate or a furandicarboxylic acid-based polyester. A preferred polyhydroxyalkanoate is polyhydroxy butyrate. Most preferably, the substrate is a polylactic acid.

According to another embodiment, the substrate is a nonpolar polymer. According to one embodiment, the nonpolar polymer comprises polyethylene, polypropylene, polystyrene and/or polyisobutylene. According to one embodiment, the nonpolar polymer is selected from the group consisting of polyethylene, polypropylene, polybutadiene, ethylene propylene diene monomer polymers, polystyrene, polyisobutylene copolymers thereof, and mixtures thereof. Such materials are known in the art.

Preferred nonpolar polymers are polyethylene, polypropylene and polystyrene. Most preferably, the substrate is a polyethylene.

According a preferred embodiment, the substrate is
- a metal, preferably a metal foil, more preferably an aluminum foil,
- a cellulose-based substrate, preferably a paper substrate or a wood substrate, more preferably a paper or a paperboard,
- a polar polymer, preferably a polyester, and most preferably polylactic acid, a polyhydroxyalkanoate or a furandicarboxylic acid-based polyester, or
- a nonpolar polymer, preferably selected from the group consisting of polyethylene, polypropylene and polystyrene.

According a preferred embodiment, the substrate is
- a cellulose-based substrate, preferably a paper substrate or a wood substrate, more preferably a paper or a paperboard,
- a polar polymer, preferably a polyester, and most preferably polylactic acid, a polyhydroxyalkanoate or a furandicarboxylic acid-based polyester, or
- a nonpolar polymer, preferably selected from the group consisting of polyethylene, polypropylene and polystyrene.

According a preferred embodiment, the substrate is
- a polar polymer, preferably a polyester, and most preferably polylactic acid, a polyhydroxyalkanoate or a furandicarboxylic acid-based polyester, or
- a nonpolar polymer, preferably selected from the group consisting of polyethylene, polypropylene and polystyrene.

The substrate may be a nonwoven material. According to one embodiment, the substrate is a nonwoven material. Such materials are known in the art. According to one embodiment, the substrate is a polymer-based nonwoven material. According to one embodiment, the substrate is a polymer-based nonwoven material, wherein the polymer is a thermoplastic material, preferably a thermoplastic polyester (e.g. polyethylene terephthalate) or a thermoplastic polyolefin (e.g. polypropylene).

The laminate comprises a heat-seal layer being present between the paper component and the substrate.

It is to be understood that it is not necessary that the entire heat-sealable coating of the inventive paper article is heat-sealed to the substrate to form the heat-seal layer of the laminate. Thus, it is possible, for example, to only subject a part of the heat-sealable coating of the paper article to the heat-sealing step for obtaining a laminate. Alternatively, it is possible to subject all of the heat-sealable coating of the paper article to the heat-sealing step for obtaining a laminate.

According to one embodiment, the laminate is obtained by heat-sealing a part of the heat-sealable coating of the paper article according to the present invention to the substrate.

According to another embodiment, the laminate is obtained by heat-sealing all of the heat-sealable coating of the paper article according to the present invention to the substrate.

According to one embodiment, the laminate is obtained by heat-sealing a part of the heat-sealable coating of the of the paper article according to the present invention to the substrate, wherein the paper article comprises a paper component being fully coated on the first side and/or second side with the heat-sealable coating.

According to one embodiment, the laminate is obtained by heat-sealing all of the heat-sealable coating of the of the paper article according to the present invention to the substrate, wherein the paper article comprises a paper component being partially coated on the first side and/or second side with the heat-sealable coating.

The inventors found that in case only a part of the heat-sealable coating of the paper article is subjected to the heat-sealing step in the preparation of the laminate, the remaining non-heat sealed coating of the paper article may provide a different functionality to the laminate such as a water barrier, water vapor barrier, an oil barrier and/or a mineral oil barrier.

The heat-seal layer can have a specific seal strength. According to one embodiment, the heat-seal layer has a seal strength of at least 1 N, preferably of at least 2 N, more preferably of at least 3 N, even more preferably of in the range of from 3 to 20 N, and most preferably in the range of 4 to 15 N. The seal strength is determined by an unsupported 90° T-peel test with a laminate test specimen having a width of 50 mm. "T-peel" test means that a laminate is prepared, which can form a T-shape as e.g. shown in FIG. 5a.

The heat-seal layer can have a specific composition. According to one preferred embodiment, the heat-seal layer comprises the components being present in the heat-sealable coating of the paper article.

The laminate is obtained by heat-sealing a paper article according to the present invention to the substrate.

According to one preferred embodiment, the heat-sealing is carried out at a temperature in the range of from 50 to 180° C., preferably from 90 to 160° C., more preferably from 110 to 140° C., and/or
- wherein the heat-sealing is carried out by applying a force per area in the range of from 0.05 to 50 N/mm$^2$, preferably from 0.1 to 20 N/mm$^2$, and more preferably from 0.2 to 5 N/mm$^2$, and/or
- wherein the heat-sealing is carried out one or more times over a time period in the range of from 0.1 to 100 seconds, preferably from 0.1 to 5 seconds, more preferably from 0.2 to 1 seconds.

According to one preferred embodiment, the heat-sealing is carried out by applying a force per area in the range of from 0.2 to 2 N/mm$^2$, preferably from 0.2 to 1 N/mm$^2$.

According to one preferred embodiment, the heat-sealing is carried out at a temperature in the range of from 50 to 180° C., preferably from 90 to 160° C., more preferably from 110 to 140° C.

According to one preferred embodiment, the heat-sealing is carried out by applying a force per area in the range of from 0.05 to 50 N/mm$^2$, preferably from 0.1 to 20 N/mm$^2$, and more preferably from 0.2 to 5 N/mm$^2$. According to one preferred embodiment, the heat-sealing is carried out one or more times over a time period in the range of from 0.1 to 100 seconds, preferably from 0.1 to 5 seconds, more preferably from 0.2 to 1 seconds.

According to one preferred embodiment, the heat-sealing is carried out at a temperature in the range of from 50 to 180° C., preferably from 90 to 160° C., more preferably from 110 to 140° C., and the heat-sealing is carried out one or more times over a time period in the range of from 0.1 to 100 seconds, preferably from 0.1 to 5 seconds, more preferably from 0.2 to 1 seconds.

According to one preferred embodiment, the heat-sealing is carried out at a temperature in the range of from 50 to 180° C., preferably from 90 to 160° C., more preferably from 110 to 140° C., and
- the heat-sealing is carried out by applying a force per area in the range of from 0.05 to 50 N/mm$^2$, preferably from 0.1 to 20 N/mm$^2$, and more preferably from 0.2 to 5 N/mm$^2$, and
- the heat-sealing is carried out one or more times over a time period in the range of from 0.1 to 100 seconds, preferably from 0.1 to 5 seconds, more preferably from 0.2 to 1 seconds.

The heat-sealing can be carried out with any apparatus and/or method, which is suitable for heat-sealing the inventive paper to the substrate. According to one embodiment, the heat-sealing is carried out by hot air sealing, induction sealing, ultrasonic sealing, ironing or hot jaw sealing. In a preferred embodiment, the heat-sealing is carried out by hot air sealing, ultrasonic sealing or hot jaw sealing, preferably hot jaw sealing. Such methods are known to the skilled person.

The laminate can be part of a product or can be used to prepare a product. For example, the laminate can be a sealing barrier in a hygiene product, a food product, preferably a food or beverage container, a drug store product or a medical product. The laminate can also be a packaging material, a construction material or a decoration material.

According to one embodiment, the laminate is a sealing barrier in a packaging for a hygiene product, a food product, a drug store product or a medical product. According to one preferred embodiment, the laminate is a sealing barrier for a food or beverage container, a blister pack, a pouch bag, preferably a food or beverage container. According to another preferred embodiment, the laminate is part of a food or beverage container, a blister pack, a pouch bag, a flow-pack bag, preferably a food or beverage container. According to one preferred embodiment, the laminate is part of a cup, preferably a cup for a food or a beverage (e.g. for cereals, coffee, etc).

According to another embodiment, the laminate is part of a packaging material, a construction material or a decoration material.

The Use of the Heat-Sealable Coating

Another aspect of the present invention refers to the use of a coating comprising
- a first polymer comprising units derived from a (meth)acrylate, and/or (meth)acrylic acid and/or a salt thereof, and
- a second polymer, being different from the first polymer, comprising units derived from
  a) a (meth)acrylate, and/or (meth)acrylic acid and/or a salt thereof, and
  b) an alkene,
  wherein the first polymer and the second polymer are present in the coating in a weight ratio of 90:10 to 35:65, and wherein the first polymer and the second polymer are present in the coating in an overall amount of at least 50 wt. %, based on the total weight of the coating,
for heat-sealing a paper component to a substrate.

In a preferred embodiment, the coating is used for heat-sealing a paper component to a substrate, wherein a heat-seal is obtained having a seal strength of at least 1 N, preferably of at least 2 N, more preferably of at least 3 N, even more preferably of in the range of from 3 to 20 N, and most preferably in the range of 4 to 15 N. The seal strength is determined by an unsupported 90° T-peel test with a laminate test specimen having a width of 50 mm.

In one embodiment, the heat-sealing is carried out at a temperature in the range of from 50 to 180° C., preferably from 90 to 160° C., more preferably from 110 to 140° C., and/or
- the heat-sealing is carried out by applying a force per area in the range of from 0.05 to 50 N/mm$^2$, preferably from 0.1 to 20 N/mm$^2$, and more preferably from 0.2 to 5 N/mm$^2$, and/or
- the heat-sealing is carried out one or more times over a time period in the range of from 0.1 to 100 seconds, preferably from 0.1 to 5 seconds, more preferably from 0.2 to 1 seconds.

According to one embodiment, the heat-sealing is carried out by hot air sealing, induction sealing, ultrasonic sealing, ironing or hot jaw sealing. In a preferred embodiment, the heat-sealing is carried out by hot air sealing, ultrasonic sealing or hot jaw sealing, preferably hot jaw sealing. Such methods are known to the skilled person.

It is to be understood that the coating for heat-sealing a paper component to a substrate is preferably defined by the features of the heat-sealable coating being part of the inventive paper article.

According to one preferred embodiment, the first polymer and the second polymer are present in the coating in a weight ratio of 90:10 to 45:55, preferably in a weight ratio of 90:10 to 55:45, more preferably 85:15 to 65:35, and most preferably 85:15 to 75:25.

According to one preferred embodiment, the coating further comprises a wax in an amount of from 0.1 to 20 wt. %, preferably 1 to 20 wt. %, more preferably 5 to 15 wt. %, and most preferably 5 to 10 wt. %, based on the total weight of the coating.

According to one preferred embodiment, the first polymer is selected from the group consisting of (meth)acrylate/acrylic acid polymers and salts thereof, poly(meth)acrylic acids and salts thereof, and mixtures thereof, preferably is a (meth)acrylate/acrylic acid polymer or a salt thereof, and more preferably is a methacrylate/acrylate/acrylic acid polymer or a salt thereof.

According to one more preferred embodiment, the first polymer is selected from the group consisting of (meth)

acrylate/acrylic acid polymers and salts thereof, poly(meth) acrylic acids and salts thereof, and mixtures thereof, preferably is a (meth)acrylate/acrylic acid polymer or a salt thereof, and more preferably is a acrylate/acrylic acid polymer or a salt thereof.

According to one preferred embodiment, the second polymer is selected from the group consisting of ethylene/(meth) acrylate polymers, ethylene/(meth)acrylate/(meth)acrylic acid polymers and salts thereof, ethylene/(meth)acrylic acid polymers and salts thereof, and mixtures thereof, preferably is an ethylene/(meth)acrylate/(meth)acrylic acid polymer or a salt thereof, and more preferably is an ethylene/methacrylate/acrylate/acrylic acid polymer or a salt thereof.

According to one preferred embodiment, the second polymer is selected from the group consisting of ethylene/(meth) acrylate polymers, ethylene/(meth)acrylate/(meth)acrylic acid polymers and salts thereof, ethylene/(meth)acrylic acid polymers and salts thereof, and mixtures thereof, preferably is an ethylene/(meth)acrylic acid polymer or a salt thereof, and more preferably is an ethylene/acrylic acid polymer or a salt thereof.

According to one preferred embodiment, the first polymer and the second polymer are present in the coating in an overall amount of at least 60 wt. %, preferably at least 70 wt. %, more preferably at least 80 wt. %, and most preferably at least 85 wt. %, based on the total weight of the coating.

According to one preferred embodiment, the coating further comprises a mineral material, preferably a calcium carbonate, in an amount of from 0.1 to 49 wt. %, preferably 1 to 35 wt. %, more preferably 10 to 30 wt. %, and most preferably 15 to 25 wt. %, based on the total weight of the coating.

According to one preferred embodiment, the coating is used on the first side and/or the second side of the paper component in an amount of from 1 to 50 g/m² preferably from 2 to 20 g/m², and more preferably from 4 to 10 g/m².

According to one preferred embodiment, the coating comprises
- a first polymer comprising units derived from a (meth) acrylate, and (meth)acrylic acid and/or a salt thereof, and
- a second polymer, being different from the first polymer, comprising units derived from
  a) a (meth)acrylate, and/or (meth)acrylic acid and/or a salt thereof, and
  b) an alkene, wherein the alkene is ethylene
wherein the first polymer and the second polymer are present in the coating in a weight ratio of 90:10 to 35:65, and wherein the first polymer and the second polymer are present in the coating in an overall amount of at least 50 wt. %, based on the total weight of the coating.

According to one preferred embodiment, the coating comprises
- a first polymer comprising units derived from a (meth) acrylate, and (meth)acrylic acid and/or a salt thereof, and
- a second polymer, being different from the first polymer, comprising units derived from
  a) a (meth)acrylate, and (meth)acrylic acid and/or a salt thereof, and
  b) an alkene, wherein the alkene is ethylene
wherein the first polymer and the second polymer are present in the coating in a weight ratio of 90:10 to 35:65, and wherein the first polymer and the second polymer are present in the coating in an overall amount of at least 50 wt. %, based on the total weight of the coating.

According to one more preferred embodiment, the coating comprises
- a first polymer comprising units derived from a (meth) acrylate, preferably an acrylate, and (meth)acrylic acid, preferably an acrylic acid, and/or a salt thereof, and
- a second polymer, being different from the first polymer, comprising units derived from
  a) a (meth)acrylic acid, preferably acrylic acid, and/or a salt thereof, and
  b) an alkene, wherein the alkene is ethylene
wherein the first polymer and the second polymer are present in the coating in a weight ratio of 90:10 to 35:65, and wherein the first polymer and the second polymer are present in the coating in an overall amount of at least 50 wt. %, based on the total weight of the coating.

According to one preferred embodiment, the coating comprises
- a first polymer consisting of units derived from at least one (meth)acrylate, and at least one (meth)acrylic acid and/or a salt thereof, and
- a second polymer, being different from the first polymer, consisting of units derived from
  a) at least one (meth)acrylate, and at least one (meth) acrylic acid and/or a salt thereof, and
  b) an alkene, wherein the alkene is ethylene
wherein the first polymer and the second polymer are present in the coating in a weight ratio of 90:10 to 35:65, and wherein the first polymer and the second polymer are present in the coating in an overall amount of at least 50 wt. %, based on the total weight of the coating.

According to one more preferred embodiment, the coating comprises
- a first polymer consisting of units derived from at least one (meth)acrylate, and at least one (meth)acrylic acid and/or a salt thereof, and
- a second polymer, being different from the first polymer, consisting of units derived from
  a) at least one (meth)acrylic acid, preferably acrylic acid, and/or a salt thereof, and
  b) an alkene, wherein the alkene is ethylene
wherein the first polymer and the second polymer are present in the coating in a weight ratio of 90:10 to 35:65, and wherein the first polymer and the second polymer are present in the coating in an overall amount of at least 50 wt. %, based on the total weight of the coating.

According to one preferred embodiment, the coating comprises
- a first polymer consisting of units derived from at least one (meth)acrylate, and at least one (meth)acrylic acid and/or a salt thereof, and
- a second polymer, being different from the first polymer, consisting of units derived from
  a) at least one (meth)acrylate, and at least one (meth) acrylic acid and/or a salt thereof, and
  b) an alkene, wherein the alkene is ethylene
wherein the first polymer and the second polymer are present in the coating in a weight ratio of 90:10 to 35:65, and wherein the first polymer and the second polymer are present in the coating in an overall amount of at least 50 wt. %, based on the total weight of the coating, wherein the coating further comprises a wax, preferably a paraffin wax, in an amount of from 5 to 15 wt. %, preferably 5 to 10 wt. %, and wherein the heat-sealable coating further comprises a mineral material, preferably a calcium carbonate, in an amount of from 0.1 to 49 wt. %, preferably 1 to 35 wt. %, more preferably 10 to 30 wt. %, and most preferably 15 to 25 wt. %, based on the total weight of the coating.

According to one preferred embodiment, the coating comprises
- a first polymer consisting of units derived from at least one (meth)acrylate, and at least one (meth)acrylic acid and/or a salt thereof, and
- a second polymer, being different from the first polymer, consisting of units derived from
  a) at least one (meth)acrylate, and at least one (meth)acrylic acid and/or a salt thereof, and
  b) an alkene, wherein the alkene is ethylene
- wherein the first polymer and the second polymer are present in the coating in a weight ratio of from 85:15 to 65:35, and preferably 85:15 to 75:25, and
- wherein the first polymer and the second polymer are present in the coating in an overall amount of at least 50 wt. %, based on the total weight of the coating, wherein the coating further comprises a wax, preferably a paraffin wax, in an amount of from 5 to 15 wt. %, preferably 5 to 10 wt. %, and wherein the heat-sealable coating further comprises a mineral material, preferably a calcium carbonate, in an amount of from 0.1 to 49 wt. %, preferably 1 to 35 wt. %, more preferably 10 to 30 wt. %, and most preferably 15 to 25 wt. %, based on the total weight of the coating.

According to one preferred embodiment, the coating comprises
- a first polymer consisting of units derived from at least one (meth)acrylate, preferably at least one acrylate, and at least one (meth)acrylic acid, preferably acrylic acid, and/or a salt thereof, and
- a second polymer, being different from the first polymer, consisting of units derived from
  a) at least one (meth)acrylate, preferably at least one acrylate, and at least one (meth)acrylic acid, preferably acrylic acid, and/or a salt thereof, and
  b) an alkene, wherein the alkene is ethylene
- wherein the first polymer and the second polymer are present in the coating in a weight ratio of from 85:15 to 65:35, and preferably 85:15 to 75:25, and
- wherein the first polymer and the second polymer are present in the coating in an overall amount of at least 50 wt. %, based on the total weight of the coating, wherein the coating further comprises a wax, preferably a paraffin wax, in an amount of from 5 to 15 wt. %, preferably 5 to 10 wt. %, and wherein the heat-sealable coating further comprises a mineral material, preferably a calcium carbonate, in an amount of from 0.1 to 49 wt. %, preferably 1 to 35 wt. %, more preferably 10 to 30 wt. %, and most preferably 15 to 25 wt. %, based on the total weight of the coating.

According to one preferred embodiment, the coating comprises
- a first polymer consisting of units derived from at least one (meth)acrylate, and at least one (meth)acrylic acid and/or a salt thereof, and
- a second polymer, being different from the first polymer, consisting of units derived from
  a) at least one (meth)acrylate, and at least one (meth)acrylic acid and/or a salt thereof, and
  b) an alkene, wherein the alkene is ethylene
- wherein the first polymer and the second polymer are present in the coating in a weight ratio of from 85:15 to 65:35, and preferably 85:15 to 75:25, and wherein the first polymer and the second polymer are present in the coating in an overall amount of at least 50 wt. %, based on the total weight of the coating, wherein the coating further comprises a wax, preferably a paraffin wax, in an amount of from 5 to 15 wt. %, preferably 5 to 10 wt. %, and wherein the heat-sealable coating further comprises a mineral material, preferably a calcium carbonate, in an amount of from 0.1 to 49 wt. %, preferably 1 to 35 wt. %, more preferably 10 to 30 wt. %, and most preferably 15 to 25 wt. %, based on the total weight of the coating. and wherein the mineral material is a natural ground calcium carbonate having a weight-median particle size $d_{50}$ in the range of from 0.1 to 20 µm, preferably in the range of from 0.1 to 10 µm, more preferably 0.3 to 5 µm, even more preferably from 0.5 to 4 µm, and most preferably from 0.7 to 2 µm, and/or a weight-based top cut particle size $d_{98}$ in the range of from 1 to 50 µm, preferably in the range of from 1 to 20 µm, more preferably 1 to 12 µm, even more preferably from 1 to 10 µm.

It is also to be understood that the substrate for which the coating is used for heat-sealing is preferably defined by the substrate being part of the inventive laminate.

According to a preferred embodiment, the substrate is
- a cellulose-based substrate, preferably a paper substrate or a wood substrate, more preferably a paper or a paperboard,
- a polar polymer, preferably a polyester, and most preferably polylactic acid, a polyhydroxyalkanoate or furandicarboxylic acid-based polyester, or
- a nonpolar polymer, preferably selected from the group consisting of polyethylene, polypropylene, polystyrene, and mixtures thereof.

According to a preferred embodiment, the substrate is a polar polymer, preferably a polyester, and more preferably a polylactic acid, a polyhydroxyalkanoate or a furandicarboxylic acid-based polyester, or
the substrate is a nonpolar polymer, preferably selected from the group consisting of polyethylene, polypropylene, polystyrene and mixtures thereof.

Furthermore, it is to be understood that the paper component with which the composition is used for heat-sealing is preferably defined by the paper component being part of the inventive paper article.

According to a preferred embodiment, the paper component is a paper, a cardboard or a paperboard, preferably having a grammage in the range of from 15 to 400 g/m², more preferably from 50 to 350 g/m², and most preferably 100 to 300 g/m².

According to a preferred embodiment, the paper component is pre-coated on the first side and/or the second side with a pre-coating comprising a mineral, preferably a calcium carbonate.

FIG. 1: Heat-seal strength of laminates obtained by heat-sealing each one of coated papers 1 to 10 against another paper being coated with an identical heat-sealable coating (sealing against sealing) at different temperatures.

Figure 2:
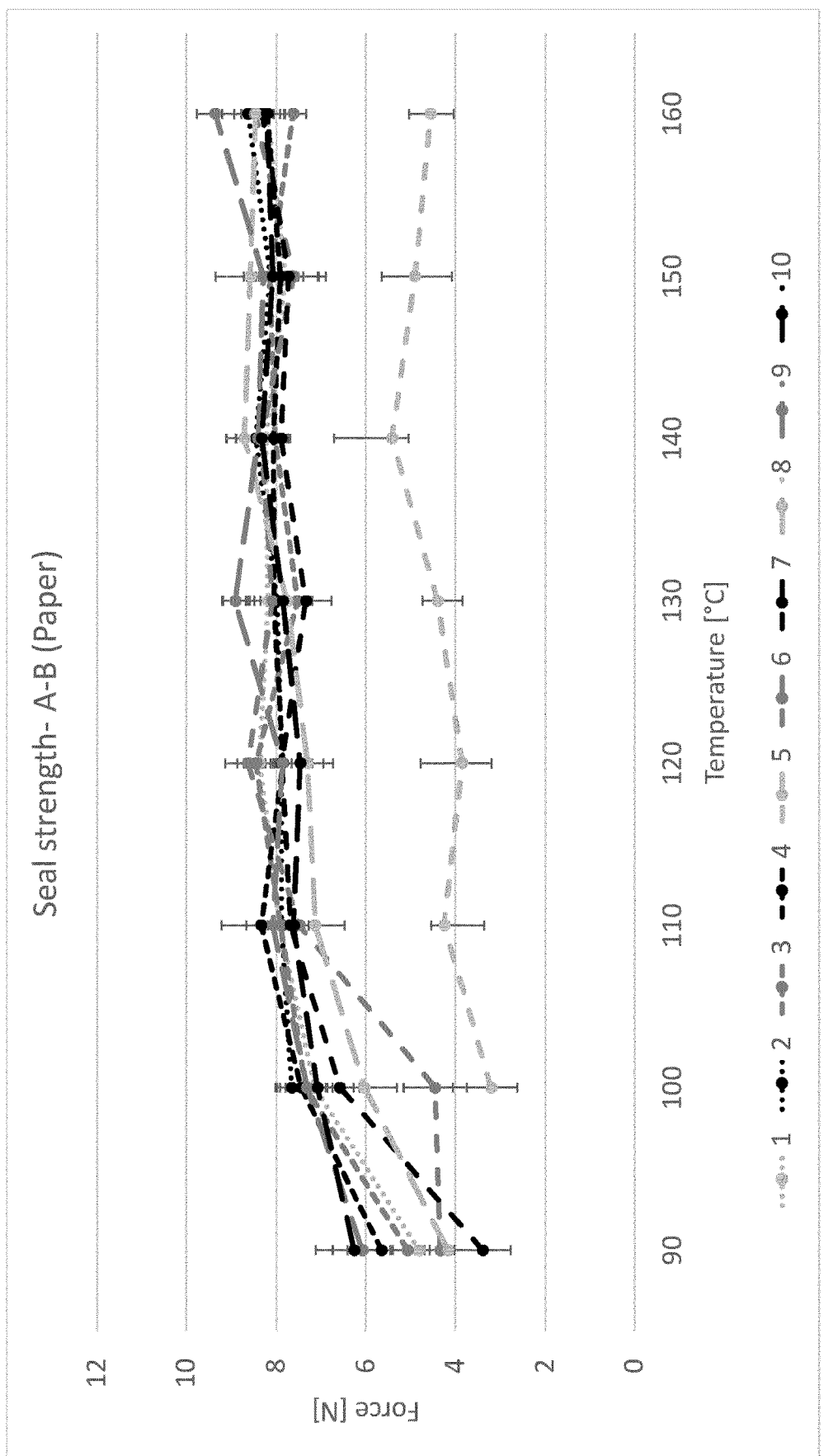

FIG. 2: Heat-seal strength of laminates obtained by heat-sealing each one of coated papers 1 to 10 against a raw paper at different temperatures.

Figure 3:
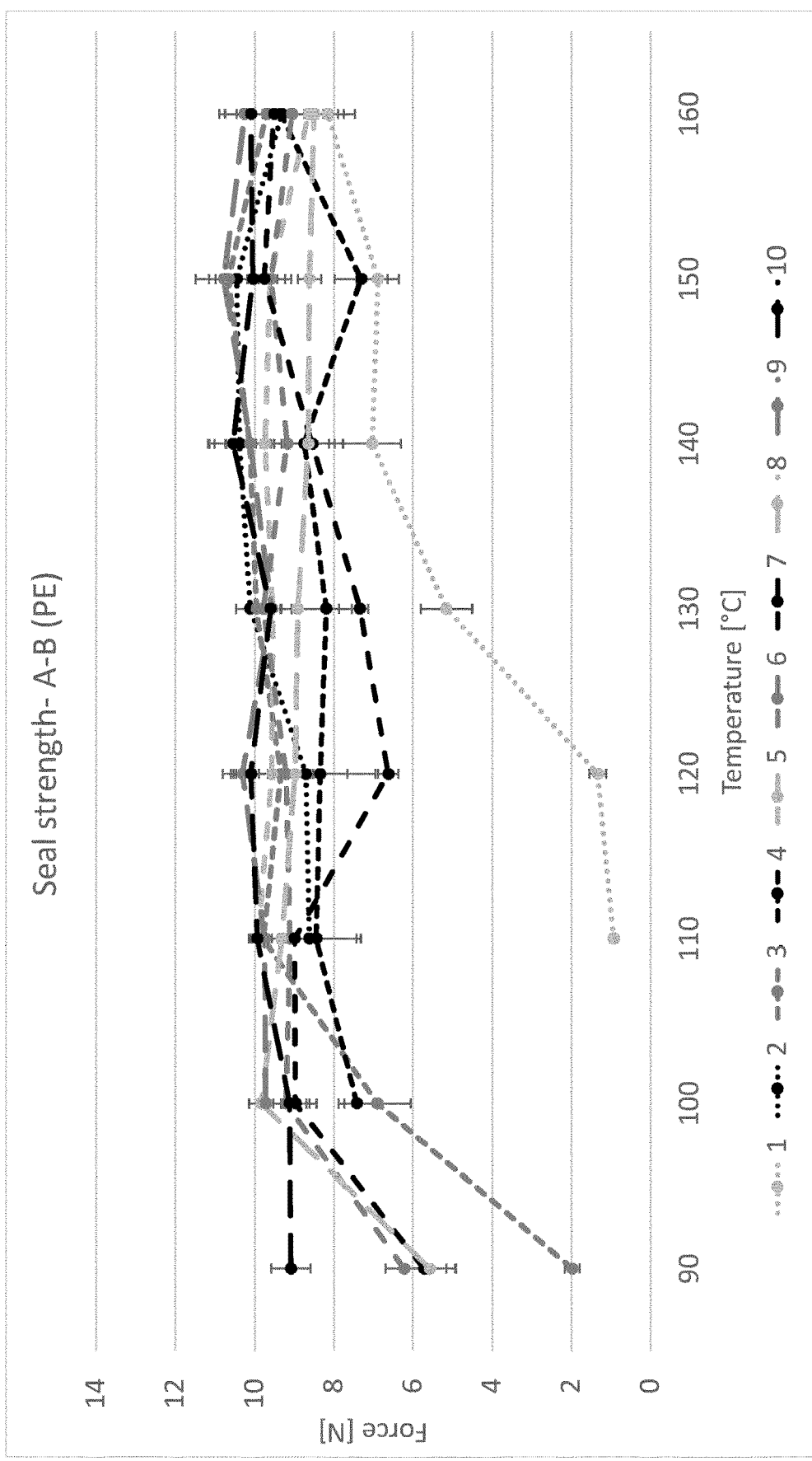

FIG. 3: Heat-seal strength of laminates obtained by heat-sealing each one of coated papers 1 to 10 against polyethylene at different temperatures.

Figure 4:
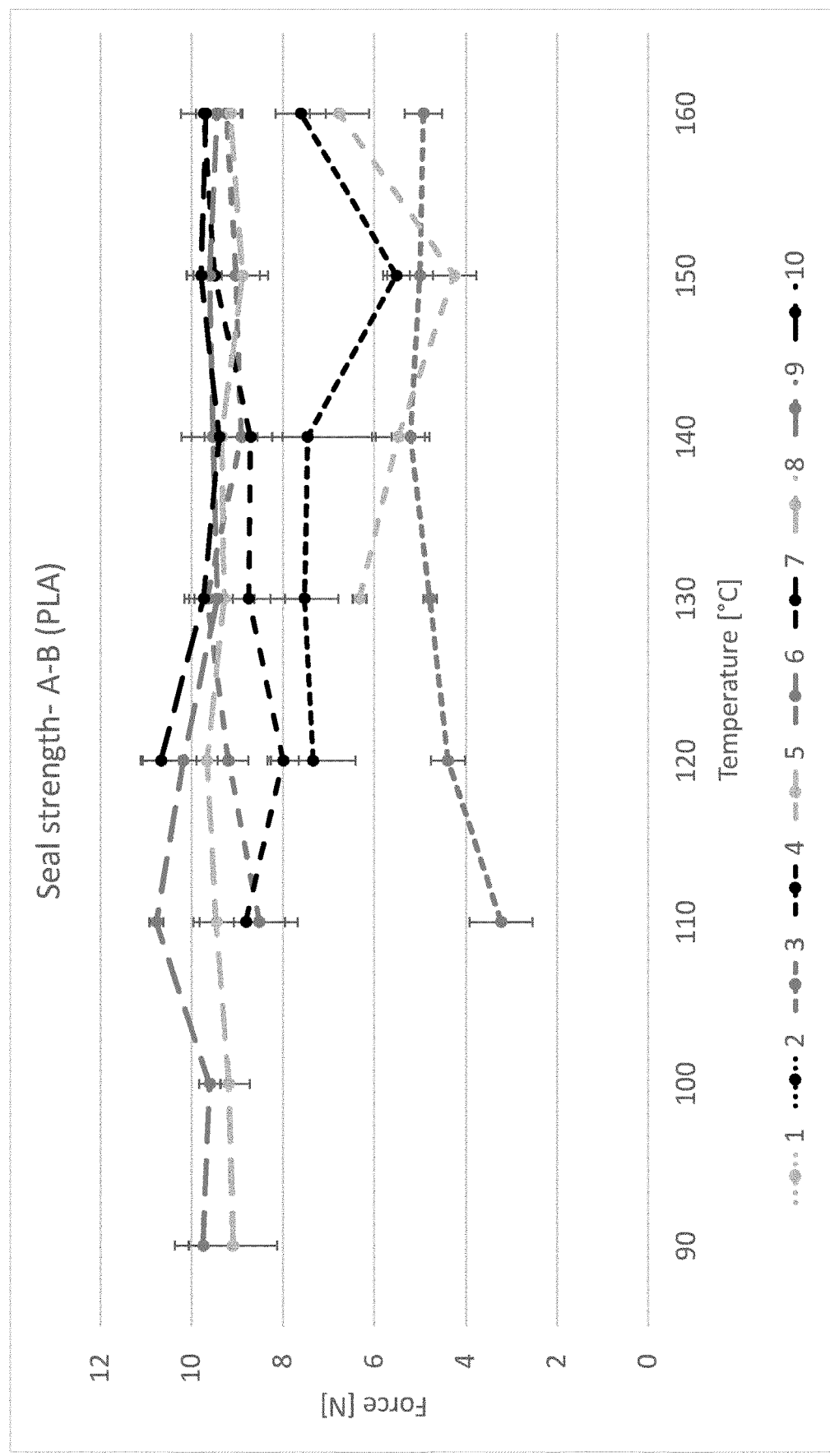

FIG. 4: Heat-seal strength of laminates obtained by heat-sealing each one of coated papers 1 to 10 against polylactic acid at different temperatures.

FIG. 5: Examples of laminates obtained by heat-sealing the paper article against itself as substrate (FIGS. 5a and 5b), and against a separate substrate (FIGS. 5c and 5d).

Figure 6A:
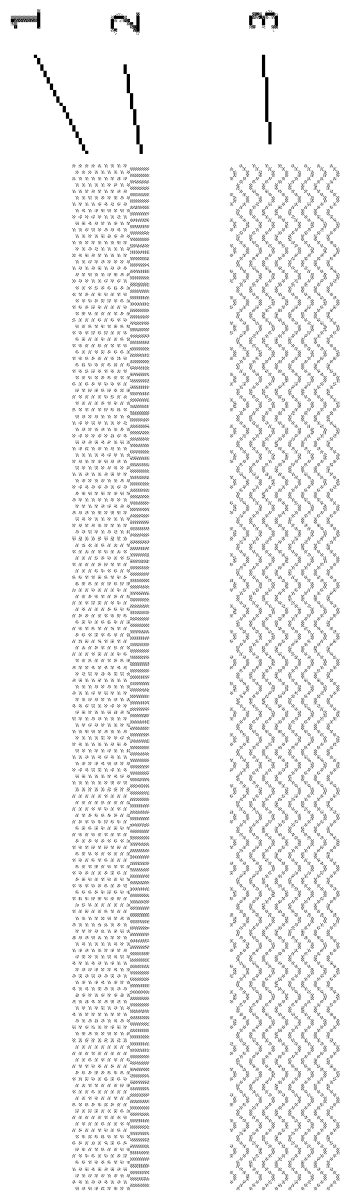
Figure 6B:
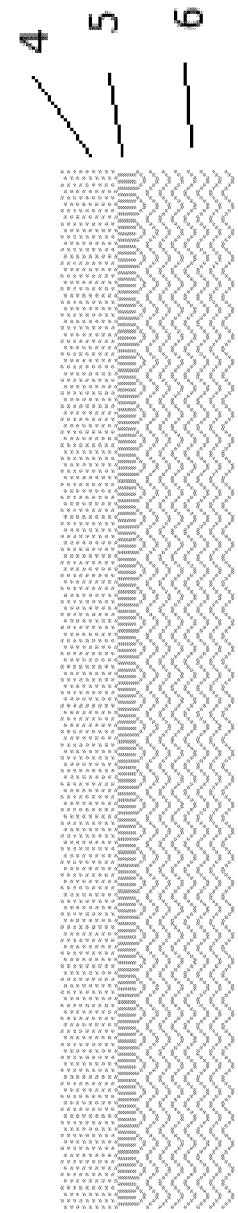

FIG. 6: (Part of) coated paper article and substrate before heat-sealing (FIG. 6a; 1=paper article, 2=heat-sealable layer, 3=substrate) and laminate obtained by heat-sealing (FIG. 6b; 1=paper article, 2=heat-seal layer, 3=substrate).

Figure 7:
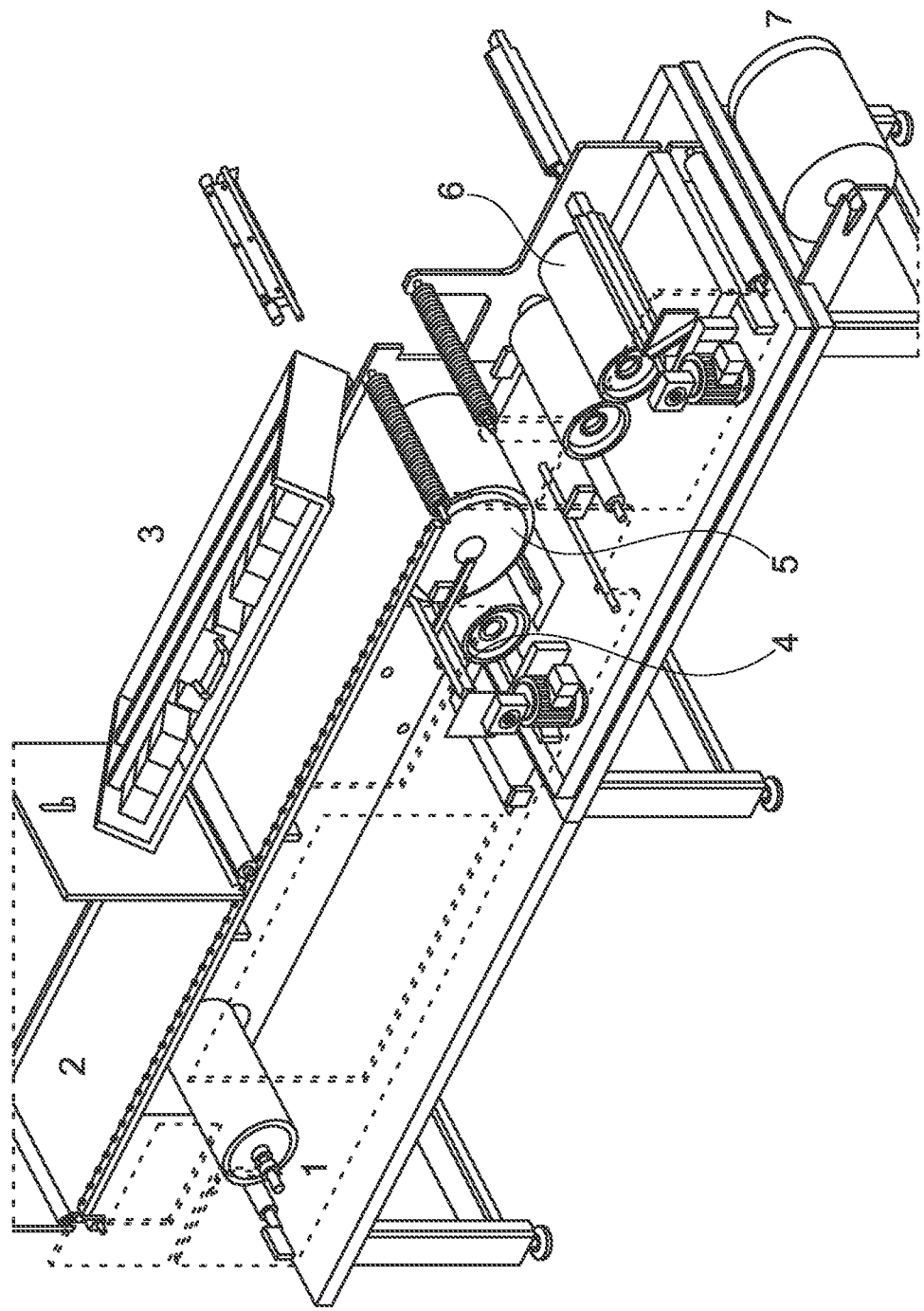

FIG. 7: Exemplary continuous laboratory coater for coating a paper article (1=rewinding, 2=hot air dryer, 3=IR-dryer, 4=Rod/Blade, 5=Unwinding (for rod/blade), 6=metering size press, 7=unwinding (for metering size press).

EXAMPLES

1. Methods

Particle Size Distribution

In the experiments, the weight-median particle size $d_{50}$ and weight top cut particle size $d_{98}$ values were measured using a Sedigraph 5125 from the company Micromeritics Instrument Corporation, USA. The method and the instrument are known to the skilled person and are commonly used to determine grain size of fillers and pigments. The measurements were carried out in an aqueous solution comprising 0.1 wt.-% $Na_4P_2O_7$. The samples were dispersed using a high speed stirrer and supersonics. For the measurement of dispersed samples, no further dispersing agents were added.

Solids Content of an Aqueous Suspension

The suspension solids content was determined using a Moisture Analyser MJ33 from the company Mettler-Toledo, Switzerland, with the following settings: drying temperature of 160° C., automatic switch off if the mass does not change more than 1 mg over a period of 30 s, standard drying of 5 to 20 g of suspension.

Determination of Oil Permeation

Oil permeation tests were carried out with a commercially available 100% corn oil colored with sudan red. 30 g of oil were weighed into a beaker, and the top of the beaker was closed with a test specimen of a paper article (80 cm², coated side down) using a tight ring. The beaker was put in an oven having a temperature of 65° C. for 10 min. The beaker was then turned upside down, so that the oil contacts the coated side of the paper article specimen. The paper article specimen is controlled over a time period of 60 min for oil permeation.

Determination of Water Absorptiveness

Cobb Unger (wl5) is measured using ISO 535:1991(E). In accordance with this method, the mass of water absorbed in a specified time by g/m² of paper or board during 1800 s time under specified conditions is measured. The conditioning atmosphere is according to ISO 187 (23° C./50% RH).

Preparation of Formulations

All mixing steps were done with a Pendraulik Laboratory Dissolver, model LD 50.

Coating of Paper Article

The coatings were applied at a coating speed of 20 m/min using a Durrer continuous laboratory coater (Switzerland) using rod metering (X23 (23 mL/m², rod pressure of approximately 1 bar, rod revolutions of 12 rpm). Durrer continuous laboratory coater; see FIG. 7; 1=rewinding, 2=hot air dryer, 3=IR-dryer, 4=Rod/Blade, 5=Unwinding (for rod/blade), 6=metering size press, 7=unwinding (for metering size press).

Heat-Sealing

Heat-sealing was performed on a Kopp Laboratory Sealer SGPE 3000 from the company Kopp (Reichenbach, Germany) equipped with sealing bar of 200×5 mm. The temperature was set up in a range of 90 to 160° C., with a sealing force of 100 N (0.4 N/mm²) and a time of sealing of 0.5 seconds.

Seal Strength

Seal strength of the seal layer in the laminates was measured with L&W Tensile test from the company Lorentzen & Wettre (Sweden) by an unsupported T-peel test using a test specimen having a 50 mm width. Seal strength at sealing break (peeling) were reported in Newton [N].

2. Materials

Polymers

Polymer Mix A: Aqueous mixture of neutralized ethylene/acrylic acid polymer (second polymer; CAS: 9010-77-9). The second polymer has a comonomer content of acrylic acid of about 20 mol-%.

Polymer Mix B: Aqueous mixture of neutralized acrylate/acrylic acid polymer (first polymer; CAS: 51981-89-6).

Polymer Mix C: Aqueous emulsion of 90 wt. % (based on total dry solids) neutralized ethylene/acrylic acid polymer (second polymer; CAS: 9010-77-9) and 10 wt. % (based on total dry solids) of paraffin wax; solid content 39.5 wt. %; pH (ISO 976:2013) 8.6; Viscosity (ISO 1652:2011) 1620 mPa*s. The second polymer has a comonomer content of acrylic acid of about 20 mol-%.

Polymer Mix D: Aqueous emulsion of 90 wt. % (based on total dry solids) neutralized acrylate/acrylic acid polymer (first polymer; CAS: 51981-89-6) and 10 wt. % (based on total dry solids) of paraffin wax; solid content 50.5 wt. %; pH (ISO 976:2013) 8.1; viscosity (ISO 1652:2011) 162 mPa*s.

Mineral Material

CC: Natural ground calcium carbonate; weight-median particle size $d_{50}$=1.6 µm; weight-based top cut particle size $d_{98}$=10 µm; slurry with solids content 77 wt. %; available from Omya, Switzerland.

Paper Component and Substrates

Paper component: Paper, precoated, 80 g/m², thickness 82 µm, available from SAPPI, Austria.

Substrate 1: Paper, precoated, 80 g/m², coated on one side with one of the coating formulations 1 to 10 (see below).

Substrate 2: Paper, raw (not precoated), 60 g/m², thickness 75 µm, available from SAPPI, Austria.

Substrate 3: Paper, grammage 120 g/m², thickness 108 µm, coated with a polylactic acid coating (30 g/m²), available from Valuepap, Austria.

Substrate 4: Paper, grammage 130 g/m², thickness 127 µm, coated with a polyethylene coating (50 g/m²), available from Valuepap, Austria.

Substrate 5: Wood substrate, particle board V20 8 mm, available from Coop, Switzerland.

Coating Compositions

Aqueous coating compositions 1 to 10 are shown in Table 1.

TABLE 1

Aqueous coating compositions

| Component | Coating composition | | | | | | | | | |
|---|---|---|---|---|---|---|---|---|---|---|
| | 1 | 2 | 3 | 4 | 5 | 6 | 7 | 8 | 9 | 10 |
| Mix A | | | | | | | | | | 50 |
| Mix B | | | | | | | | | | 50 |
| Mix C | 100 | 70 | 60 | 50 | 40 | 40 | 30 | 15 | 0 | |
| Mix D | 0 | 30 | 40 | 50 | 40 | 60 | 70 | 85 | 100 | |
| CC | | | | | 20 | | | | | |
| Dry weight ratio (first polymer:second polymer) | 0:100 | 30:70 | 40:60 | 50:50 | 50:50 | 60:40 | 70:30 | 85:15 | 100:0 | 50:50 |
| Solid content | 39.1 | 42.1 | 42.8 | 43.9 | 48.2 | 44.6 | 45.0 | 47.5 | 49.8 | 43.3 |
| pH | 8.5 | 8.4 | 8.4 | 8.2 | 8.3 | 8.2 | 8.2 | 8.1 | 8.0 | 8.1 |
| Viscosity (100 rpm) | 2540 | 100 | 110 | 80 | 70 | 80 | 80 | 80 | 140 | 90 |

3. Results 3.1 Coated Paper Article Each one of the coating formulations 1 to 10 were used to fully coat a first side of the paper component. The coating was carried out as described above. After drying, a paper article is obtained comprising a paper component being coated fully coated on a first side with a coating.

The final coated paper articles 1 to 10 had a coating weight and a Cobb value as shown in Table 2.

TABLE 2

Paper articles 1 to 10

| | Paper article | | | | | | | | | |
|---|---|---|---|---|---|---|---|---|---|---|
| | 1 | 2 | 3 (IE) | 4 (IE) | 5 (IE) | 6 (IE) | 7 (IE) | 8 (IE) | 9 | 10 (IE) |
| Coating weight (g/m²) | 7.4 | 8.3 | 8.3 | 7.7 | 9.9 | 8.3 | 9.2 | 8.6 | 9.4 | 7.8 |
| COBB 1800 (g/m²) | 1.4 | 15.6 | 18.4 | 40.8 | 23.8 | 14.3 | 10.0 | 11.0 | 9.2 | 66.5 |

IE = Inventive example.

Each one of the paper articles 1 to 10 was tested for heat-sealing against a) the same type of coated paper as substrate (substrate 1; heat-sealing against a substrate also coated with the heat-sealable coating; A-A), b) against a raw paper as substrate (Substrate 2; A-B Paper), c) against polyethylene as substrate (substrate 4, A-B PE), and d) against polylactic acid as substrate (substrate 3, A-B PLA).

The heat-sealing tests were carried out at different temperatures ranging from 90° C. to 160° C. and the seal strength was measured. The results of the heat-sealing tests are shown in Tables 3 to 6 and FIGS. 1 to 4.

TABLE 3

Seal strength for laminates obtained by heat-sealing each one of paper articles 1 to 10 against substrate 1 (A-A; coating against coating)

| Sealing temperature [° C.] | Paper article |||||||||| 
|---|---|---|---|---|---|---|---|---|---|---|
| | 1 | 2 | 3 | 4 | 5 | 6 | 7 | 8 | 9 | 10 |
| | Seal strength [N] |||||||||| 
| 90 | 8.9 | 1.2 | 6.8 | 6.5 | —* | 7.5 | 7.6 | 8.6 | 9.3 | 8.4 |
| 100 | 9.0 | 5.3 | 7.6 | 6.9 | 4.9 | 7.9 | 7.4 | 8.6 | 9.3 | 8.7 |
| 110 | 9.2 | 7.3 | 7.8 | 7.4 | 5.6 | 8.3 | 7.8 | 8.7 | 8.9 | 8.8 |
| 120 | 9.5 | 8.9 | 8.0 | 7.4 | 6.3 | 7.6 | 7.8 | 8.4 | 9.9 | 8.7 |
| 130 | 8.1 | 8.4 | 7.4 | 7.7 | 5.8 | 8.3 | 7.6 | 8.5 | 10.1 | 8.6 |
| 140 | 9.0 | 7.6 | 8.4 | 8.3 | 5.7 | 8.9 | 7.6 | 9.1 | 10.1 | 8.9 |
| 150 | 9.8 | 8.3 | 8.1 | 7.9 | 5.7 | 7.8 | 8.3 | 9.3 | 10.2 | 9.4 |
| 160 | 9.5 | 7.7 | 7.4 | 8.1 | 5.2 | 8.1 | 8.0 | 9.2 | 9.8 | 8.5 |

*= did not seal.

TABLE 4

Seal strength for laminates obtained by heat-sealing each one of paper articles 1 to 10 against substrate 2 (A-B; coating against raw paper)

| Sealing temperature [° C.] | Paper article |||||||||| 
|---|---|---|---|---|---|---|---|---|---|---|
| | 1 | 2 | 3 | 4 | 5 | 6 | 7 | 8 | 9 | 10 |
| | Seal strength [N] |||||||||| 
| 90 | 4.8 | -* | 5.1 | 5.6 | —* | 4.3 | 3.4 | 4.2 | 6.1 | 6.3 |
| 100 | 7.1 | 7.7 | 7.3 | 7.4 | 3.2 | 4.5 | 6.6 | 6.0 | 7.3 | 7.1 |
| 110 | 7.9 | 7.9 | 7.9 | 8.3 | 4.2 | 7.5 | 7.7 | 7.1 | 8.1 | 7.6 |
| 120 | 8.4 | 7.9 | 8.5 | 7.9 | 3.9 | 8.6 | 7.9 | 7.3 | 7.9 | 7.5 |
| 130 | 8.2 | 8.0 | 7.5 | 8.1 | 4.4 | 8.1 | 7.3 | 7.8 | 8.9 | 7.9 |
| 140 | 8.2 | 8.5 | 8.0 | 8.1 | 5.4 | 8.3 | 7.9 | 8.7 | 8.4 | 8.3 |
| 150 | 7.8 | 8.1 | 8.1 | 7.9 | 4.9 | 7.6 | 7.7 | 8.6 | 8.3 | 8.1 |
| 160 | 8.2 | 8.6 | 7.6 | 8.2 | 4.6 | 8.5 | 8.3 | 8.5 | 9.4 | 8.2 |

*= did not seal.

TABLE 5

Seal strength for laminates obtained by heat-sealing each one of paper articles 1 to 10 against substrate 4 (A-B; coating against PE)

| Sealing temperature [° C.] | Paper article |||||||||| 
|---|---|---|---|---|---|---|---|---|---|---|
| | 1 | 2 | 3 | 4 | 5 | 6 | 7 | 8 | 9 | 10 |
| | Seal strength [N] |||||||||| 
| 90 | —* | —* | 2.0 | —* | —* | 6.2 | 5.7 | 5.6 | —* | 9.1 |
| 100 | —* | —* | 6.9 | 7.4 | —* | 9.2 | 9.0 | 9.8 | 9.7 | 9.1 |
| 110 | 0.9 | 8.6 | 9.8 | 8.4 | 9.9 | 9.1 | 9.0 | 9.3 | 9.7 | 9.9 |
| 120 | 1.3 | 8.7 | 9.3 | 8.3 | 9.6 | 9.2 | 6.6 | 9.0 | 10.3 | 10.1 |
| 130 | 5.2 | 10.1 | 10.0 | 8.2 | 9.5 | 9.8 | 7.3 | 8.9 | 9.6 | 9.6 |
| 140 | 7.0 | 10.4 | 10.1 | 8.7 | 9.7 | 9.2 | 8.5 | 8.6 | 10.1 | 10.5 |
| 150 | 6.9 | 10.5 | 10.7 | 7.3 | 9.6 | 9.6 | 9.8 | 8.6 | 10.8 | 10.0 |
| 160 | 8.2 | 9.3 | 9.7 | 9.3 | 8.6 | 9.1 | 9.5 | 8.5 | 10.3 | 10.1 |

*= did not seal.

TABLE 6

Seal strength for laminates obtained by heat-sealing each one of paper articles 1 to 10 against substrate 3 (A-B; coating against PLA)

| Sealing temperature [° C.] | Paper article |||||||||| 
|---|---|---|---|---|---|---|---|---|---|---|
| | 1 | 2 | 3 | 4 | 5 | 6 | 7 | 8 | 9 | 10 |
| | Seal strength [N] |||||||||| 
| 90 | —* | —* | —* | —* | —* | —* | —* | 9.1 | 9.7 | —* |
| 100 | —* | —* | —* | —* | —* | —* | —* | 9.2 | 9.6 | —* |
| 110 | —* | —* | 3.2 | —* | —* | 8.5 | 8.8 | 9.5 | 10.8 | —* |
| 120 | —* | —* | 4.4 | 7.3 | —* | 9.2 | 8.0 | 9.7 | 10.2 | 10.7 |
| 130 | —* | —* | 4.8 | 7.5 | 6.3 | 9.7 | 8.8 | 9.3 | 9.4 | 9.7 |
| 140 | —* | —* | 5.2 | 7.5 | 5.5 | 8.9 | 8.7 | 9.3 | 9.5 | 9.4 |
| 150 | —* | —* | 5.0 | 5.5 | 4.2 | 9.0 | 9.5 | 8.9 | 9.6 | 9.8 |
| 160 | —* | —* | 4.9 | 7.6 | 6.8 | 9.2 | 9.7 | 9.2 | 9.4 | 9.7 |

*= did not seal.

As can be seen by the indicated seal strength in Tables 3 to 6 and FIGS. 1 to 4, for inventive paper articles 3 to 8 and 10 a good heat-seal strength is obtained for all types of substrates 1 to 4.

The comparison of inventive paper articles 4 and 10 shows that the addition of wax to the heat-sealable coating (paper 4) decreases the Cobb value of the paper article without negatively affecting the ability of the paper article to seal against all substrate types. The comparison of inventive paper articles 4 and 5 shows that the addition of calcium carbonate to the heat-sealable coating (paper 5) further decreases the Cobb value of the paper article and allows for modifying the seal strength without negatively affecting the ability of the paper article to seal against all substrate types.

Paper articles 1 and 2 do not seal against polylactic acid as substrate, i.e. show a seal strength of 0 N for heat-sealing at temperatures from 90° C. to 160° C. (see FIG. 4). Further, paper articles 1 and 2 only seal against polyethylene as substrate at a temperature of 110° C. or above (see FIG. 3). Paper article 9 does not seal at a temperature of 90° C. against polyethylene as substrate (see FIG. 3).

The invention claimed is:

1. A paper article comprising
    a paper component having a first side and a second side, wherein the first side and/or the second side of the paper component is at least partially coated with a heat-sealable coating, wherein the heat-sealable coating comprises
        a first polymer consisting of units derived from a (meth)acrylate, and/or (meth)acrylic acid and/or a salt thereof, and
        a second polymer, being different from the first polymer, comprising units derived from
            a) a (meth)acrylate, and/or (meth)acrylic acid and/or a salt thereof, and
            b) an alkene,
        wherein the first polymer and the second polymer are present in the heat-sealable coating in a weight ratio of 90:10 to 35:65, and
        wherein the first polymer and the second polymer are present in the heat-sealable coating in an overall amount of at least 50 wt. %, based on the total weight of the coating.

2. The paper article according to claim 1, wherein the first polymer and the second polymer are present in the heat-sealable coating in a weight ratio of 90:10 to 45:55.

3. The paper article according to claim 1, wherein the heat-sealable coating further comprises a wax in an amount of from 0.1 to 20 wt. %, based on the total weight of the coating.

4. The paper article according to claim 1, wherein the first polymer is selected from the group consisting of (meth)acrylate/acrylic acid polymers and salts thereof, poly(meth)acrylic acids and salts thereof, and mixtures thereof.

5. The paper article according to claim 1, wherein the second polymer is selected from the group consisting of ethylene/(meth)acrylate polymers, ethylene/(meth)acrylate/(meth)acrylic acid polymers and salts thereof, ethylene/(meth)acrylic acid polymers and salts thereof, and mixtures thereof.

6. The paper article according to claim 1, wherein the first polymer and the second polymer are present in the heat-sealable coating in an overall amount of at least 60 wt. %, based on the total weight of the coating.

7. The paper article according to claim 1, wherein the heat-sealable coating further comprises a mineral material in an amount of from 0.1 to 49 wt. %, based on the total weight of the coating.

8. The paper article according to claim 1, wherein the heat-sealable coating is present on the first side and/or the second side of the paper component in an amount of from 1 to 50 g/m$^2$ and/or
    wherein the first side and/or the second side of the paper component is fully coated with the heat-sealable coating.

9. The paper article according to claim 1, wherein the paper component is a paper, a cardboard or a paperboard.

10. The paper article according to claim 1, wherein the paper component is pre-coated on the first side and/or the second side with a pre-coating comprising a mineral material.

11. A laminate comprising a substrate, a paper component, and a heat-seal layer being present between the paper component and the substrate,
    wherein the laminate is obtained by heat-sealing a paper article according to claim 1 to the substrate.

12. The laminate according to claim 11, wherein the substrate is
    a cellulose-based substrate, a paper substrate or a wood substrate,
    a polar polymer, a polyester, a polylactic acid, a polyhydroxyalkanoate or furandicarboxylic acid-based polyester, or
    a nonpolar polymer, polyethylene, polypropylene, polystyrene, or mixtures thereof.

13. The laminate according to claim 11, wherein the heat-sealing is carried out at a temperature in the range of from 50 to 180° C. and/or
    wherein the heat-sealing is carried out by applying a force per area in the range of from 0.05 to 50 N/mm$^2$ and/or
    wherein the heat-sealing is carried out one or more times over a time period in the range of from 0.1 to 100 seconds.

14. The paper article according to claim 1, wherein the first polymer is acrylate/acrylic acid polymer or a salt thereof.

15. The paper article according to claim 1, wherein the second polymer is an ethylene/acrylic acid polymer or a salt thereof.

16. The paper article according to claim 1, wherein the heat-sealable coating is present on the first side and/or the second side of the paper component in an amount of from 4 to 10 g/m$^2$, and wherein the first side of the paper component is fully coated with the heat-sealable coating.

17. The paper article according to claim 1, wherein the paper component is pre-coated on the first side and/or the second side with a pre-coating comprising a calcium carbonate.

18. The laminate according to claim 11, wherein the substrate is a paper substrate.

19. The laminate according to claim 11, wherein the heat-sealing is carried out at a temperature in the range of from 110 to 140° C.

20. A method for forming a laminate, comprising
    heat sealing a paper component to a substrate to form the laminate;
    wherein the first side and/or the second side of the paper component is at least partially coated with a heat-sealable coating, some of the heat-sealable coating is between the paper component and the substrate prior to forming the laminate, and the heat-sealable coating comprises
    a first polymer consisting of units derived from a (meth)acrylate, and/or (meth)acrylic acid and/or a salt thereof, and a second polymer, being different from the first polymer, comprising units derived from a) a (meth)acrylate, and/or (meth)acrylic acid and/or a salt thereof, and b) an alkene, wherein the first polymer and the second polymer are present in the heat-sealable coating in a weight ratio of 90:10 to 35:65, and wherein the first polymer and the second polymer are present in the heat-sealable coating in an overall amount of at least 50 wt. %, based on the total weight of the heat-sealable coating.

21. The method according to claim 20, wherein the substrate is a polar polymer, a polyester, a polylactic acid, a polyhydroxyalkanoate or a furandicarboxylic acid-based polyester, or wherein the substrate is a nonpolar polymer, polyethylene, polypropylene, polystyrene or mixtures thereof.

22. The paper article according to claim 1, wherein the heat-sealable coating further comprises a wax and the wax is paraffin.

* * * * *